United States Patent
Kline et al.

(10) Patent No.: US 8,910,167 B2
(45) Date of Patent: Dec. 9, 2014

(54) PARALLEL PROCESSING SYSTEM

(75) Inventors: Christopher John Kline, Quincy, MA (US); Jesse Johnson, Weymouth, MA (US); Andrew Ralich, Londonderry, NH (US)

(73) Assignee: oneZero Financial Systems, LLC, Cambridge, MA (US)

( * ) Notice: Subject to any disclaimer, the term of this patent is extended or adjusted under 35 U.S.C. 154(b) by 257 days.

(21) Appl. No.: 13/555,027

(22) Filed: Jul. 20, 2012

(65) Prior Publication Data

US 2014/0026150 A1    Jan. 23, 2014

(51) Int. Cl.
    *G06F 9/46* (2006.01)
(52) U.S. Cl.
    USPC ........... 718/100; 718/101; 718/102; 718/105; 718/106; 718/107
(58) Field of Classification Search
    None
    See application file for complete search history.

(56) References Cited

U.S. PATENT DOCUMENTS

| | | | |
|---|---|---|---|
| 2006/0046855 A1* | 3/2006 | Nguyen et al. | 463/43 |
| 2007/0198665 A1* | 8/2007 | De Matteis et al. | 709/220 |
| 2007/0294696 A1* | 12/2007 | Papakipos et al. | 718/102 |
| 2010/0088490 A1* | 4/2010 | Chakradhar et al. | 712/34 |
| 2011/0181589 A1* | 7/2011 | Quan et al. | 345/420 |

OTHER PUBLICATIONS

Flajolet et al. Sequence of operations analysis for dynamic data structures. [online] (1980). Academic Press, Inc., pp. 111-141. Retrieved From the Internet <http://algo.inria.fr/flajolet/Publications/FlFrVu80.pdf>.*

* cited by examiner

*Primary Examiner* — Emerson Puente
*Assistant Examiner* — Jonathan R Labud
(74) *Attorney, Agent, or Firm* — Wolf, Greenfield & Sacks, P.C.

(57) ABSTRACT

Software development tools and techniques for configuring parallel processing systems to execute software modules implementing processes for solving complex problems, including over-the-counter trading processes and foreign exchange trading processes, to execute quickly and efficiently. The parallel processing system may include low-cost, consumer-grade multicore processing units. A process for solving a complex problem may be divided into software modules, including by evaluating the process to determine discrete processing steps that produce an intermediate result on which later steps of the process depend. The software modules created for a process may form a template processing chain describing multiple processing chains of the process that are to be executed. A software development tool for producing configuration information for multicore processing units may evaluate the software modules and the processing chains to determine whether the modules will execute quickly and efficiently on the multicore processing units of the parallel processing system.

30 Claims, 16 Drawing Sheets

PARALLEL PROCESSING SYSTEM

BACKGROUND

Commercial trading, such as trading in financial markets and trading of financial products, typically takes one of two forms: exchange trading and non-exchange trading.

Exchange trading occurs with the assistance of a public exchange, in which buyers and sellers openly advertise availability of trades and the prices at which the trades may be made. Because of the public nature of exchanges, trades of the same items (e.g., the same stock for the same company) that occur at the same time typically occur for the same price or roughly the same price. Stock exchanges like the New York Stock Exchange (NYSE), in which stocks are traded publicly and are available at a publicly-advertised price, are an example of exchange.

Non-exchange trades, on the other hand, are not public and are not advertised, but instead occur privately between two parties. In a non-exchange trade, one party may privately offer a trade to another party and the trade may be executed when the other party accepts, without anyone else being notified of the trade, the item being traded, or the price. The private nature of the trades may lead to trades for the same item at the same time being carried out at different prices when different pairs of parties are involved. In some cases, one seller may offer the same item to different buyers at different prices at the same time, because the privacy of the trading decreases the risk that the buyers will discover the different pricing. Similarly, buyers may receive offers for trades of the same item at the same time from different sellers with different prices. Non-exchange trades are also commonly known as over-the-counter (OTC) trades.

One example of OTC trading is foreign exchange trading, also called FX trading or "forex" trading. In foreign exchange trading, one party may offer to another to trade one form of currency (e.g., one nation's currency) for another form of currency (e.g., another nation's currency) at a rate of exchange between the two currencies set by the seller. Many different banks and other financial institutions engage in foreign exchange trading and the exchange rates for foreign exchange trading may vary widely. A buying or selling party may set exchange rates for each pair of currencies individually, without regard to whether there is consistency in or equivalence between the parties' exchange rates for multiple sets of currencies.

The differences in pricing between parties for OTC trades may create an opportunity for profit through multiple trades of items to multiple parties at different prices. When these multiple trades for profit are carried out in the foreign exchange market, this is known as "financial arbitrage." Triangular arbitrage is a form of financial arbitrage in which a party trades between three different forms of currency, often with multiple different parties, to realize a profit. FIG. 1 illustrates an example of a triangular arbitrage. In the arbitrage 100 of FIG. 1, a first party begins with US$1 million and receives an offer for transaction 102 from a second party indicating that the second party will trade euros for the U.S. dollars at an exchange rate of 1.35225 USD/EUR. When the first party carries out this transaction 102, the first party possesses €739,508.23. The first party may then receive another offer for a transaction 104 from a third party indicating that the third party will trade British pounds for euros at exchange rate of 0.68211 GBP/EUR. When the first party carries out this transaction 104, the first party possesses £504,425.96. The first party may then receive another offer for a transaction 106 from a fourth party indicating that the fourth party will trade U.S. dollars for British pounds at an exchange rate of 2.00 USD/GBP. When the first party carries out this last transaction 106, the first party again possesses U.S. dollars, but has US$1,008,851.91 following the series of trades, where the first party originally had US$1,000,000, resulting in a net profit from the arbitrage of US$8,851.91.

Profit from arbitrage is possible in part because of the differences in exchange rates for currencies between parties that accompanies OTC trading. In exchange markets, the prices for transactions are similar between parties at a given time, as discussed above. In an OTC market, in contrast, while exchange rates across the market may be generally consistent, small variations in prices that are established by parties create the potential for profits and create the potential for large profits when the volume of a trade (e.g., the amount of currency exchanged) is large.

SUMMARY

In one embodiment, there is provided a method comprising generating, using at least one processor, a plurality of processing chains for parallel execution on at least one processing unit comprising a plurality of processing cores. The generating comprises generating each of the plurality of processing chains according to a template processing chain and a specification of data to be processed by the plurality of processing chains. The template processing chain comprises a plurality of software modules in which at least one software module receives one or more inputs that are one or more outputs of one or more other software modules of the plurality of software modules, and the specification of data defines a plurality of inputs to be processed by the plurality of processing chains. The generating comprises generating the plurality of processing chains such that each processing chain of the plurality of processing chains is adapted to cause the at least one processing unit to perform operations defined by the plurality of software modules on at least a portion of the data defined by the specification of data. The method further comprises selecting a configuration for the at least one processing unit for executing the plurality of processing chains on the plurality of processing cores. The selecting is carried out based at least in part on an execution efficiency of the plurality of processing chains when the at least one processing unit is configured according to the configuration. The method further comprises producing configuration information for configuring the at least one processing unit according to the configuration.

In another embodiment, there is provided a method comprising evaluating, using at least one processor, a plurality of software modules for execution on at least one processing unit comprising a plurality of processing cores. A first portion of the plurality of software modules receive as inputs outputs generated by a second portion of the plurality of software modules. The evaluating comprises evaluating the plurality of software modules to identify at least one change to the plurality of software modules to increase an execution efficiency of the plurality of software modules when executed in parallel on the at least one processing unit comprising the plurality of processing cores. The method further comprises, in response to the evaluating, automatically editing, using the at least one processor, the plurality of software modules to implement the at least one change to increase the execution efficiency of the plurality of software modules.

In a further embodiment, there is provided a method comprising evaluating, using at least one processor, operations of a plurality of software modules to be executed in parallel on a plurality of processing cores, evaluating, using at least one processor, characteristics of data to be processed by the plurality of software modules, and, based at least in part on the evaluation of the operations and the evaluation of the characteristics, producing configuration information for configuring the plurality of processing cores to execute the plurality of software modules. Producing the configuration information comprises producing configuration information based at least in part on differences between a first type of processing core of the plurality of processing cores and a second type of processing core of the plurality of processing cores.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
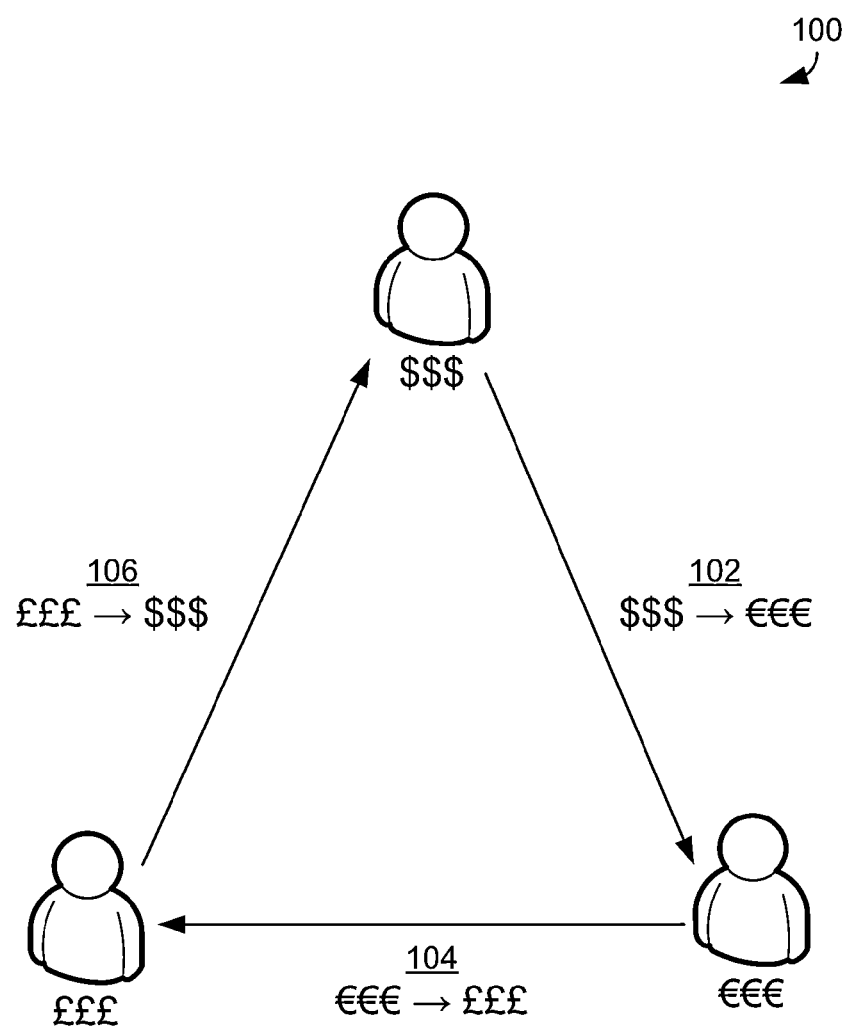
FIG. 1 is a depiction of a sequence of non-exchange trades carrying out a triangular arbitration.

Applicants have recognized and appreciated that though high-frequency trading (HFT) techniques have been developed for exchange-based trades, HFT techniques for OTC trading are lacking. Moreover, Applicants have recognized and appreciated that by providing a framework for programming low-cost hardware, including consumer-grade generally-programmable graphics processing units (GPGPUs) and/or other processing units that include multiple processing cores, high-frequency trading for OTC markets can be enabled both quickly and inexpensively. Such a framework may also enable programming low-cost hardware, such as consumer-grade GPGPUs to perform processing for producing solutions to complex problems using parallel execution on the processing units.

High-frequency trading (HFT) techniques have been developed for trading of items in exchange markets. HFT allows computing devices, configured with trading systems, to process streams of data regarding prices in the exchange and make trading decisions based on those prices. Trading systems for HFT in exchange markets can be complex due to the breadth of items traded in an exchange market (e.g., the number of stocks offered in an exchange). In exchange markets, though, the types of trades that can be executed, the prices of the trades, or the sources of data are relatively consistent. The nature of exchanges makes the price for each item consistent between parties, and all prices for items in a given exchange can be derived from one common source. Additionally, the trades in exchanges are primarily cash exchanges, which means that an item is associated with one price (i.e., the cost of the item in cash in one currency). Because there is only one type of trade (the cash trade), a trading system for HFT would not have to consider multiple different prices for an item, each associated with a different type of trade. Trading systems for HFT in exchanges therefore may not have to account for types of trades, variations in prices of trades, or sources of data.

OTC trading markets, however, may not have only one type of trade for an item (i.e., may not have only one price for an item), may not have consistent pricing for those items between parties, and may not have prices that can be derived from one common source. Rather, as discussed above, each party that may make a trade in an OTC market may have a different price for an item when traded for multiple other items (e.g., one price for a currency traded with a first currency, and a different price for that currency traded with the second currency, where the two prices are not consistent), and may even have different prices for those trades between counterparties. Additionally, the prices set by a party for trades may be private and may not be obtainable from anywhere other than directly from that party. Still further, prices in OTC trading can be changed by parties widely and quickly, with some prices being known to change multiple times, even hundreds or thousands of times, per second. OTC trading can be far more complex than exchange trading as a result of these extra variables introduced in OTC trading.

Applicants have recognized and appreciated that the complexity of OTC trading has hindered the development of high-frequency trading in the OTC markets. Additionally, this complexity has limited the types of trading conducted in OTC markets. For example, OTC markets enable profits to be made through sequences of trades, such as in the case of triangular arbitrage discussed above in connection with FIG. 1. Identifying a potential profit in a sequence of trades includes analyzing the possible trades that can be made and determining which sequence of those trades would result in a profit. The complexity of OTC trading and the number of variables to be considered have limited this analysis. Traditionally, three transactions, such as in the case of triangular arbitrage, was the maximum number of transactions that could be considered.

Applicants have further recognized and appreciated that the complexity and number of variables to be considered for OTC trading have therefore traditionally prevented the development of trading systems for using HFT techniques to execute OTC trades. The complexity of any possible HFT systems for executing OTC trades has meant that such systems would have had to be executed on complex, and costly, hardware. For example, a trading system for HFT trading in OTC markets might have been executed on a large, distributed system of interconnected computers to enable the HFT techniques to be executed. However, programming such hardware is a difficult task, and can be costly. Creating software code that is able to execute on such a platform is difficult and requires specialized training. Additionally, distributed systems are disadvantageous in the OTC market because of the latency of operations for such systems. HFT systems rely on overall execution speed to make trades and realize profits. Delay in execution can result in a missed opportunity for a trade and a missed profit. Distributed systems may require a large amount of space and power for operation and are therefore often implemented on computers or devices that are distant from computers that do not form a part of the distributed system, and are often connected to these other computers via the Internet. Because of the location, transferring data to and from the computers of a distributed system may require an amount of time that is unacceptably large for trading systems using HFT techniques, particularly for OTC trades. The time necessary to transfer trading information from sources of trading information to the distributed system and the time necessary to transfer outputs of the distributed system back to a system for effecting a trade would be too large for trades to be made in OTC markets. Thus, even if such distributed systems could have been programmed to implement a trading system using HFT techniques in OTC markets, the various disadvantages of such systems for operation in OTC markets prevented their use in HFT systems.

Applicants have recognized and appreciated the advantages of enabling trading systems for using HFT techniques in OTC markets to be executed using low-cost, consumer-grade hardware. Consumer-grade hardware such as multicore processing units, such as central processing units (CPUs) and generally-programmable graphics processing units (GPGPUs), are relatively low cost and may be able to execute complex operations in parallel using the multiple cores. Moreover, such an implementation allows computing devices that identify desirable trades to be implemented in a compact way. As a result, a system for high frequency trading may be installed in one or a small number of physical devices close to a source of trading information. Applicants have also recognized and appreciated that OTC trading is not the only type of complex problem that may benefit from being executed efficiently in parallel on low-cost, consumer grade hardware. Many other systems in other contexts, including contexts other than OTC trading and other than financial markets, could benefit from being executed in parallel on low-cost, consumer-grade hardware.

However, consumer-grade hardware can be difficult to program for efficient execution of operations for complex problems. Applicants have recognized that configuring GPGPUs (or other multicore processing units) to execute operations quickly and efficiently has conventionally been performed in an ad hoc way by individual programmers with a deep understanding of the manner in which GPGPUs operate and the manner in which the GPGPUs will process the precise instructions that are to be executed by the GPGPUs. Applicants have also recognized that many programmers do not have this deep understanding of multicore processing units and are not capable of configuring processing units to execute operations quickly and efficiently.

In view of the foregoing, Applicants have recognized the advantages of software development tools that evaluate software modules developed for performing operations for complex problems on multicore processing units. Such software development tools may identify, based on the evaluation, configurations for the multicore processing units that will enable operations for the complex problems to be performed quickly and efficiently on the multicore processing units. Applicants have additionally recognized and appreciated the advantages of making such software development tools generic to particular types of operations to be carried out on target hardware to perform the complex problems. As mentioned above, configuring multicore processing units to execute operations quickly and efficiently often requires a deep understanding of the precise instructions that are to be executed by the multicore processing units and the manner in which those instructions will be executed, as well as hardware characteristics of the multicore processing units. For example, configuring a multicore processing unit to execute operations quickly and efficiently may require knowledge of how one or more types of memory access operation are executed, such as the latency of an operation, or knowledge of memory to be accessed, such as the size of a cache or data transfer speeds for a memory. Therefore, it may be beneficial for software development tools to correspond to specific complex problems and evaluate operations based on information about a specific complex problem to which the operations relate when producing configuration information for multicore processing units. Applicants have recognized, however, that software development tools can be created that are generic to the complex problems to be performed and that are able to evaluate operations that relate to many different complex problems to produce configuration information. In particular, Applicants have recognized and appreciated that by configuring software development tools to evaluate characteristics of software modules in particular ways, such software development tools can produce configuration information for configuring multicore processing unit to quickly and efficiently execute software modules regardless of the problem or domain to which the software modules relate.

Accordingly, described herein are software development tools and techniques for creating software modules to implement processes for solving complex problems, including OTC trading processes such as foreign exchange trading processes. In some embodiments, a process for solving a complex problem may be divided into software modules in any suitable manner, including by evaluating the process to determine discrete processing steps that are repeated in the process and that produce an intermediate result of the process on which later steps of the process depend. Such modules may be executable instructions that are arrange in any suitable way. In some cases, the modules may be logical units. A logical unit may be, for example, a logical portion of a larger logical unit or a distinct logical unit. A logical portion of a larger logical unit may be, for example, a function contained within a file, and a distinct logical unit may be, for example, a file.

Software modules created from identifying discrete processing steps of a process may correspond to repeated operations in the process. Accordingly, in some embodiments, software modules that are created for a process may be formed as a template processing chain. The template processing chain may describe processing chains that form a part of the process and that are repeatedly executed in parallel, on different data, to implement the process. Multiple different processing chains may be created from the template processing chain by replicating modules of the template processing chain for the multiple processing chains. The multiple processing chains may be mapped to processing cores of one or more low-cost, consumer-grade multicore processing units to be executed on the cores and implement the process. Types of and sources of data to be provided as input to each processing chain may also be specified. A software development tool for producing configuration information for configuring multicore processing units to efficiently execute the software modules may evaluate the software modules and the data to be processed to identify the configuration information.

In some embodiments, a software development tool may generate multiple processing chains, each corresponding to some of the types and sources of data to be provided as input. In such embodiments, generating the plurality of processing chains may include replicating template software modules of the template processing chain to produce multiple processing chains each including the software modules. When the software modules are replicated, the software development tool may also identify sources of input data for the software modules and destinations of output data for the software modules. Identifying sources of input data may include identifying software modules that accept as input output generated by other software modules. The software development tool may then evaluate the software modules of the multiple processing chains to determine a configuration of the multicore processing unit(s) that will enable efficient execution of the plurality of processing chains. In evaluating execution efficiency, the software development tool may consider differences between cores of processing units on which the software modules may execute. Differences between cores may include differences in capabilities and in configurations of cores, as well as differences in the manner in which cores may execute instructions. Cores for which differences are evaluated may include cores of the same processing unit. By considering the differences between cores, the software development tool may be able to account for these differences in configuring the software modules and/or the cores. By accounting for these differences in the configuration, the software development tool may be able to take advantage of differences between cores in a way that increases speed and/or efficiency of execution of the software modules.

The evaluation for speed and efficiency may be carried out to ensure that the overall set of software modules executes quickly and efficiently, or to ensure that each individual software module executes quickly and efficiently, or based on any other suitable factors relating to efficiency. Execution efficiency of software modules may, in some embodiments, be determined based at least in part on efficiency of time spent executing the software modules. Efficiency of time spent executing the modules may be evaluated based at least in part on an amount of time processing cores spend executing instructions for software modules and/or an amount of time processing cores spend not executing instructions for the software modules. In some embodiments, for example, the ratio of these amounts of time may be calculated in determining execution efficiency. Efficiency of execution of software modules may additionally or alternatively be evaluated in terms of power efficiency of the software modules. Some instructions, when executed by one or more processors, may cause the processor(s) to draw more power than when other instructions are executed. In some cases, the difference in power consumption of the processors when the different instructions are executed may be slight. However, when the instructions are executed many times, such as many times by one processor or many times across many processors, the difference in power consumption may not be negligible and may be significant. Reducing power consumption may reduce costs of executing the instructions. Thus, in some embodiments, efficiency of power consumption may be evaluated in determining the efficiency of execution of the software modules. The evaluation of efficiency may be based on any suitable characteristics of software modules, examples of which are discussed in detail below.

Based at least in part on the evaluation of the software modules, the software development tool may produce configuration information for the multicore processing unit(s). The configuration information may include information to configure hardware and/or software of a multicore processing unit to execute the software modules. The information to configure hardware and/or software may include information to configure a management facility that interacts with hardware of a multicore processing unit. The management facility may be executed by one or more processing units separate from the unit to which the management facility relates. The configuration information may also include information to configure hardware of a multicore processing unit, such as information that is to be written to registers of a multicore processing unit and used by the hardware and/or firmware integrated with the hardware. Configuration information may include any suitable information.

In some embodiments, the configuration information may arrange the multicore processing unit(s) according to one configuration out of multiple different available configurations. The configuration information may include instructions to be executed by one or more cores to implement the software modules. The instructions to be executed by one or more cores may include software modules arranged in an intermediate language. The intermediate language may be one that is not executable on a processing core of a multicore processing unit on which the software modules are to execute. A management facility of the multicore processing unit may be configured to interpret instructions in the intermediate language to create sets of instructions for execution on cores of the processing unit. Configuration information may include information to configure the management facility to perform the interpretation in a particular manner, such as by preferring particular types of instructions over other types of instructions when interpreting the intermediate language and creating sets of instructions. The configuration information may additionally or alternatively identify an interrelationship (e.g., dependency) between software modules and the inputs and outputs of software modules, processing cores of the multicore processing unit(s) to which software modules should be assigned for execution, a relative time at which software modules should execute, and/or any other suitable information.

Once sets of instructions for the software modules are produced based on the intermediate language and the configuration information, the instructions and the configuration information may be used to configure a multicore processing unit. The multicore processing unit(s) may be configured to execute the multiple processing chains based on the sets of instructions and the configuration information. The multicore processing unit(s) may then be operated to execute instructions for the software modules for the multiple processing chains to perform the process to which the software modules and multiple processing chains relate.

In some embodiments, software modules that, when executed by one or more multicore processing units cause the processing units to implement an OTC trading system, such as a foreign exchange trading system, can be evaluated by such a software development tool. One or more multicore processing units may therefore be configured to implement an OTC trading system by executing multiple software modules in parallel on the processing cores of the multicore processing unit(s). Examples of ways in which a multicore processing unit can be configured to efficiently execute software modules to implement an OTC trading system are discussed below.

Various examples of ways in which techniques described herein may be implemented are described below. It should be appreciated, however, that embodiments are not limited to operating according to any of these exemplary techniques and that other embodiments are possible.

For example, in various embodiments described above and below, software modules may be described as relating to foreign exchange trading. Embodiments are not, however, limited to operating in the foreign exchange trading context or in any OTC trading context, but rather may operate to produce solutions to complex problems in any suitable context. Techniques described herein may be useful in producing solutions to problems in which multiple possible options are to be evaluated quickly and one or more of the options is to be selected based on one or more criteria. Such problems may include those in which data of multiple different types or from multiple different sources are to be evaluated using the same or similar processes. A problem for which the same or similar processes are to be carried out on data may be well suited for the parallel execution and automated creation of software modules as described herein.

As an example of another problem to which the techniques described herein may be applied, in some embodiments software modules may relate to a Black-Scholes process for determining leverage and risk of financial investments. As another example, in other embodiments, software modules may relate to a price cleansing process for determining whether advertised prices for trades are outliers and potentially erroneous. Outside of the financial industry, embodiments may relate to performing navigational routing, including rerouting upon encountering a condition such as traffic on an originally-chosen route. Any suitable complex problem may be analyzed and processed using techniques described herein.

Additionally, the software modules may be described in examples below as operating on low-cost, consumer-grade hardware such as a generally-programmable graphics processing unit (GPGPU) having multiple processing cores, such as hundreds of processing cores. However, it should be appreciated that embodiments are not limited to operating with GPGPUs or any other form of graphics processing unit (GPU), as other hardware types are possible. For example, in some embodiments, a central processing unit (CPU) having multiple cores may be used, while in other embodiments a combination of one or more CPUs having multiple cores and one or more GPGPUs having multiple cores may be used. In still other embodiments, other types of processing units that have or can be arranged as multiple processing cores, such as one or more Field-Programmable Gate Arrays (FPGAs) arranged to include multiple processing cores or Application Specific Integrated Circuits (ASICs) that include multiple processing cores, may be used alone or in combination with a CPU and/or a GPU. Embodiments are not limited to operating with any particular form of hardware.

Figure 2:
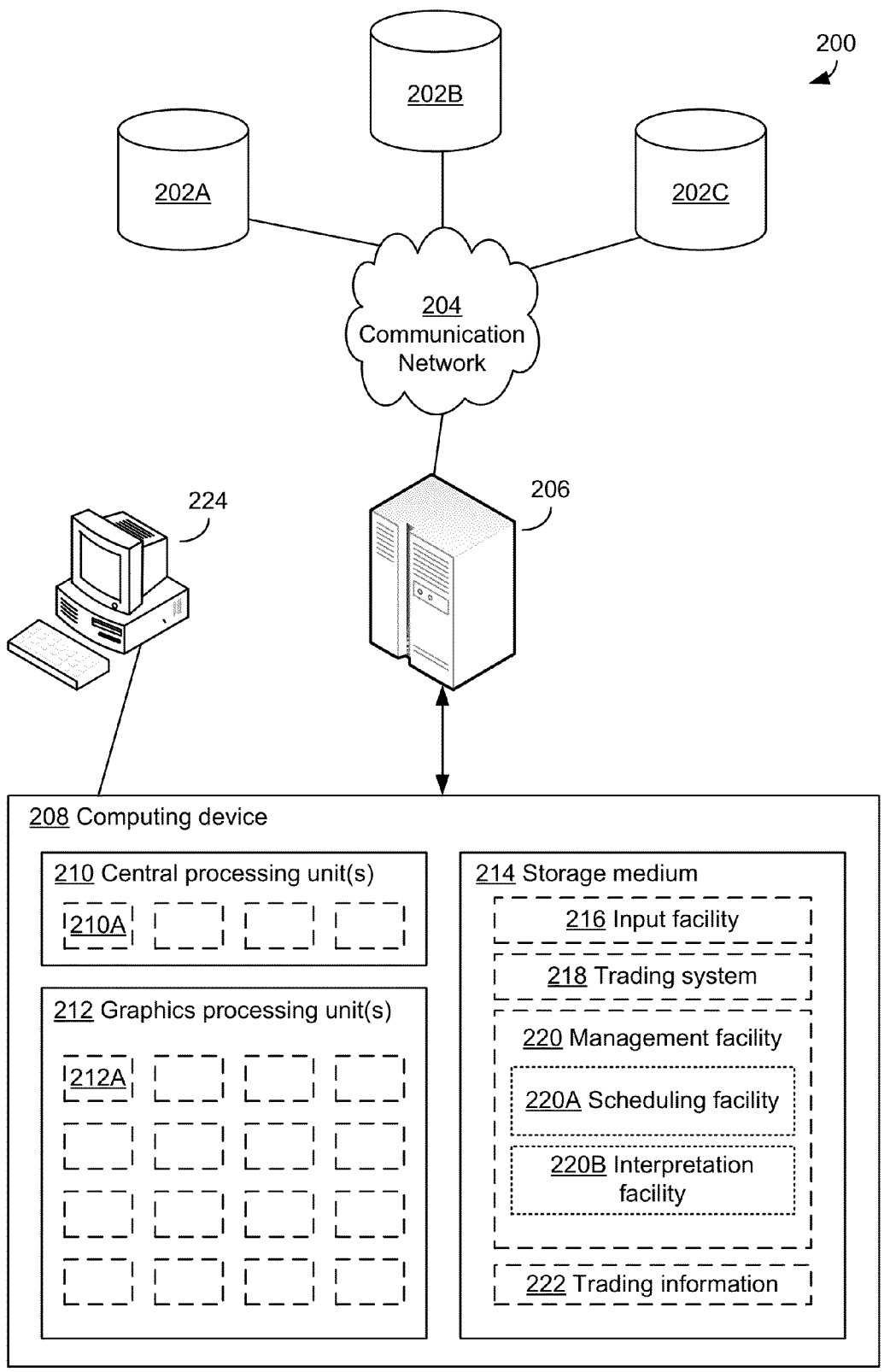
FIG. 2 is a block diagram of a computer system in which some embodiments may operate.

FIG. 2 illustrates an example of a computer system in which some embodiments may operate. The computer system 200 illustrated in FIG. 2 is an example of a financial trading environment in which a trading system operating according to techniques described herein may carry out OTC trades, including foreign exchange trades.

The computer system 200 includes multiple different components of a financial trading environment, including computing devices and sources of data operated by multiple different parties to financial trades. The computer system 200, as illustrated in FIG. 2, includes multiple sources of data 202A, 202B, 202C. Each of the sources of data 202A, 202B, 202C may be a source of trading information and may be implemented in any suitable manner as any suitable source of data. In some embodiments, for example, the sources of data may be computing devices operated by trading parties that execute automated processes for determining trading information for trades to be executed by the devices on behalf of the trading parties. In other embodiments, the sources of data may be database servers or other computing devices that may communicate trading information, as embodiments are not limited to operating with any particular type of data source.

The trading information available from the sources of data may include any suitable information about financial trades that may be carried out in the financial trading environment. For example, the trading information may identify, for a trading party that is advertising a potential financial trade, buy and/or sell prices for trades that the trading party is willing to make, and may also include a volume of a trade that the party is willing to execute at that price. In addition to price and volume, the trading information may include information identifying the trade, such as information identifying items to be traded. For example, for a trade of one currency for another, the two currencies to be traded may be identified.

Each of the sources of data 202A, 202B, 202C may be a source of trading information for an entity that is a party to potential trades. For example, source of data 202A may be a source of trading information for one bank, source of data 202B may be a source of trading information for another bank, and source of data 202C may be a source of information compiled by an aggregator of trading information that includes prices from multiple other potential parties. While three sources of data are illustrated in the example of FIG. 2, it should be appreciated that embodiments are not limited to operating with any particular number of sources of data.

Trading information provided by the sources of data 202A, 202B, 202C may be received by a bridge 206, which may be any application executing on any suitable computing device able to receive and process trading information. In some embodiments, the bridge 206 may be a computing device, dedicated to operating as a bridge, that is configured with hardware and/or software to operate as a liquidity bridge to carry out foreign exchange trading operations. When implemented as a liquidity bridge, the bridge 206 may operate according to any suitable techniques, including known techniques, for operating a liquidity bridge. In other embodiments, the bridge 206 may be a software program executing on a processing unit of a device. The bridge 206, when implemented as a program, may be executed on any suitable device to execute trades, including device 208.

Bridge 206 may process data received from the multiple different sources of data in any suitable manner. For example, the bridge 206 may aggregate the trading information received from the multiple different sources of data and store the trading information in one location to be later retrieved for analysis. As another example, the bridge 206 may reformat trading information received from each of the multiple sources of data, such as in the case where trading information is received from different sources of data in different formats. To aid in subsequent review and analysis of trading information received from the multiple different sources of data, the bridge may reformat trading information received from the multiple sources of data, such that the trading information is in one consistent format. In embodiments in which the bridge 206 reformats the data, the bridge 206 may reformat the data in any suitable manner and store the data in any suitable format, as embodiments are not limited in this respect.

The bridge 206 may be communicatively connected in any suitable manner to each of the sources of data 202A, 202B, 202C to receive the trading information. FIG. 2 illustrates the bridge 206 connected to the sources of data via a communication network 204. The communication network 204 may include any suitable wired and/or wireless communication medium. In some embodiments, the communication network 204 may include multiple direct fiber-optic connections between the bridge 206 and each of the sources of data 202A, 202B, 202C, such that the bridge 206 has a direct and dedicated connection to each of the sources of data. A fiber optic cable may be used in some embodiments in which the bridge 206 is co-located with the sources of data 202A, 202B, 202C, such as by being located in the same data room. In other embodiments, however, the communication network 204 may include one or more local and/or wide-area networks, including an enterprise network and/or the Internet. Embodiments are not limited to operating with any particular type of connection between the bridge 206 and the sources of data 202A, 202B, 202C.

In addition to receiving and processing trading information, the bridge 206 may also transmit communications, on behalf of an operator of the bridge 206, to execute potential trades identified by the trading information received from the sources of data. Executing the potential trade may include attempting to complete a trade and/or completing a trade. The operator of the bridge 206 may be any suitable entity, including an owner of the bridge 206, a subscriber to a service with which the bridge 206 is connected, a human user of the bridge 206, or any other entity on behalf of which trades may be executed. The bridge 206 may communicate with any suitable destination to execute a trade identified by the trading information, including by communicating to one or more of the sources of data. The bridge 206 may transmit any suitable communication to the destination to execute a trade, including using known communications and known techniques for automatically executing trades, as embodiments are not limited in this respect.

The bridge 206 may execute a trade on behalf of an operator of the bridge 206 in response to any suitable instruction identifying a trade to be executed. For example, the bridge 206 may receive instruction from a human user to execute a trade and, in response to the instruction from the human user, communicate to a destination to execute the trade instructed by the human user. Additionally or alternatively, the bridge 206 may receive instruction to carry out a trade from an automated trading system that is analyzing the trading information received from the sources of data and identifying desirable trades. The automated trading system may identify desirable trades based on any suitable criteria, including by determining potential trades identified by the training data that have the highest potential for profit. In accordance with techniques described herein, the trading system may be implemented as a collection of software modules executing in parallel on low-cost, consumer-grade multicore processing units.

As discussed above, trading information for OTC trades, including foreign exchange trades, may be complex and contain multiple different variables, each of which may be changing quickly. For example, the bridge 206 may receive trading information from the source of data 202A multiple times per second, including hundreds or thousands of times per second. In addition, the trading information received from the source of data 202A may include multiple different prices for multiple different potential trades, each of which may be changing each time the trading information is received from the source of data 202A. Similar trading information may be received at a similar rate from each of the other sources of data. In addition, a trading party that releases the trading information, such as a trading party that operates one of the sources of data, may only honor prices for trades identified by trading information for a relatively small window of time. For example, once trading information for a potential trade, such as the price associated with the potential trade, changes, the trading party may stop honoring previous trading information immediately or after a short time. After that time, the trading party may decline to execute the trade identified by the trading information. Analyzing the multiple different, rapidly-changing pieces of data in trading information quickly enough to ensure that a desirable trade can be identified and executed while a potential counterparty to a potential trade will still approve and complete the trade is a complex process. In addition, analyzing trading information to identify a sequence of multiple trades, such as a sequence of trades that may be carried out for financial arbitrage (described above in connection with FIG. 1), quickly enough for each of the trades in an identified sequence to be approved and completed by the other parties to those trades is a complex process.

Some trading systems may add to this complexity by considering other factors in determining whether particular trades are desirable. For example, in some embodiments, trading systems may consider other factors in addition to an anticipated profit associated with a potential trade, such as factors relating to a likelihood of a counterparty to a potential trade approving and completing the trade. Considering a likelihood of a counterparty to a potential trade approving the potential trade and the potential trade being executed and completed may be advantageous because the trading system may identify that a potential trade that is not likely to be approved is not desirable, and therefore not attempt to execute the potential trade even if the potential trade may be profitable. The trading system may therefore, in some cases, attempt to avoid spending time attempting to execute a potential trade that is ultimately not approved by a counterparty. The system may instead attempt to execute one or more trades that are more likely to be approved, even if these trades have a lower anticipated profit than some trades that are unlikely to be completed.

Therefore, in some embodiments, a trading system may consider, for a trade with a counterparty identified by trading information received from the counterparty, in addition to price, factors that may indicate a likelihood of a potential trade being approved by a counterparty. Such factors that are indicative of whether a trade may be approved may include a number of trades recently executed by the operator of the bridge 206 with the counterparty. Such recent trades may be trades executed by the operator with the counterparty within a past amount of time, such as the past minute, the past five minutes, the past day, or any other suitable unit of time. The number of recent trades may be considered by a trading system because some counterparties may monitor this number and deny trades with the operator when the number is too high. A trading system may therefore consider a number of recent trades when determining a likelihood of a trade being executed. Additionally or alternatively, a trading system may consider, when determining likelihood, a number of potential trades that the trading system identified as desirable and attempted to execute, but that were denied by the counterparty to the trade. By considering the number of recent trades that were denied by a counterparty, the trading system can account for a trading party that has been recently denying trades and attempt to avoid trades with that party. The system may, for example, adjust the likelihood of a potential trade being approved to indicate that the new potential trade is less likely to be executed when the trading system detects that the counterparty to that new potential trade has recently been denying trades. Any other suitable factors may be considered by a trading system in determining a likelihood of a potential trade being approved by counterparties and executed, as embodiments are not limited to evaluating any particular factors when determining whether a potential trade is desirable, including whether a potential trade is likely to be executed.

Accordingly, trading systems that evaluate trading information received by the bridge 206 to identify desirable trades and instruct the bridge 206 to execute trades identified as desirable may need to quickly execute complex processes for evaluating the trading information. As discussed above, Applicants have recognized and appreciated that performing such complex processes quickly on low-cost hardware may be enabled using techniques described herein.

The computer system 200 of FIG. 2 illustrates a computing device 208 in communication with the bridge 206 that may evaluate trading information received by the bridge 206, identify trades to be executed by the bridge 206, and instruct the bridge 206 to execute the trades. The computing device 208 includes one or more multicore processing units on which a trading system may execute to perform the evaluation, identification, and instruction of the trading system.

The computing device 208 may be implemented in any suitable manner having any suitable form factor. In some embodiments, for example, the computing device 208 may be implemented as a desktop or laptop personal computer. In other embodiments, the computing device 208 may be implemented as a rack-mounted server or multiple rack-mounted servers that are connected together in a manner that provides low latency for communications between the rack-mounted servers. The computing device 208 includes one or more multicore processing units to execute operations of a trading system in parallel. The multicore processing units may be low-cost multicore processing units, including consumer-grade multicore processing units.

In the example of FIG. 2, the multicore processing units of the computing device 208 include one or more central processing units 210 and one or more generally-programmable graphics processing units 212. The central processing units 210 include multiple processing cores 210A, each of which can be operated individually and in parallel with other processing cores of the central processing units 210 to execute instructions of the trading system. The graphics processing units 212 also include multiple processing cores 212A, which also can be operated individually and in parallel with one another to execute instructions of a trading system.

The computing device 208 additionally includes one or more storage media 214 to store instructions for execution on the multicore processing units and to store data to be processed by the multicore processing units. As illustrated in FIG. 2, the storage media 214 stores an input facility 216, a trading system 218 including software modules, a management facility 220 that includes a scheduling facility 220A and an interpretation facility 220B, and trading information 222.

The input facility 216, when executed by one or more of the multicore processing units, may communicate with the bridge 206, receive trading information from the bridge 206 and store the trading information as trading information 222 in the storage media 214.

The trading system 218 includes multiple different software modules, such as tens, hundreds, or thousands of software modules, that may be executed in parallel on different processing cores of the multicore processing units 210, 212 of the computing device 208. When the software modules of the trading system 218 are executed in parallel on the processing cores of the multicore processing units 210, 212, instructions of each of the software modules that correspond to a portion of the trading system are executed. By executing in parallel on the processing cores of the multicore processing units 210, 212, the software modules of the trading system 218 can execute quickly and efficiently to perform operations of the trading system 218.

The management facility 220 may manage a multicore processing unit, such as by managing the graphics processing unit 212. The management facility 220 may manage the graphics processing unit 212 by managing interactions between hardware of the graphics processing unit 212 and other components of the device 208. In some embodiments, the management facility 220 may be a device driver for the unit 212 or may perform operations of a device driver for the unit 212. The management facility may accept configuration information for configuring the graphics processing unit 212 and may carry out operations to configure the unit 212 based on the configuration information. As part of configuring the unit 212 based on the configuration information, a scheduling facility 220A and an interpretation facility 220B of the management facility 220 may carry out configuration operations. As discussed in greater detail below, the scheduling facility 220A may schedule software modules for execution on cores 212A of the graphics processing unit 212 according to scheduling constraint information contained within the configuration information. Also as discussed in greater detail below, in embodiments in which software modules of the trading system 218 are not formatted in a way that is executable by the cores 212A, the interpretation facility 220B may reformat the software modules for execution. The interpretation facility 220B may reformat the software modules in any suitable manner. In some embodiments, the interpretation facility 220B may examine operations of the software modules and create sets of instructions that can be executed by the cores 212A. For example, in some embodiments the software modules of the trading system 218, when provided to the management facility 220 for execution by the cores 212A, may include instructions formatted in an intermediate language that the cores 212A cannot execute. The interpretation facility 220B may interpret the intermediate language and create, for each module, sets of instructions that can be executed by the cores 212A and that correspond to the operations of the software module.

As discussed briefly above and in detail below, Applicants have recognized and appreciated that executing the complex operations of a trading system (as well as complex operations outside of the financial industry, in other domains) on low-cost hardware can be enabled through the use of a software development tool for increasing execution efficiency of software modules. Such a software tool may evaluate software modules of a trading system, may automatically edit the software modules based on the evaluation, and may produce configuration information for multicore processing units based on the evaluation of the software modules. The software development tool may evaluate any other suitable information along with the software modules, including information regarding target hardware on which the modules are to be executed. For example, differences between cores of a multicore processing unit that is to execute software modules may be evaluated by the software development tool. The software development tool may automatically edit the modules themselves or edit a collection of interconnected modules to change the manner in which the modules communicate with one another, to add software modules to the collection, and/or to remove software modules from the collection. Configuration information produced by the software development tool may include information that may be provided to and processed by the management facility 220. The configuration information may, in some embodiments, include information that may be used to configure the scheduling facility 220A to schedule software modules for execution on cores 212A in a particular manner. In embodiments in which the interpretation facility 220B interprets software modules to produce sets of instructions for execution on cores, the configuration information may additionally or alternatively include information to configure the interpretation facility 220B. The information to configure the interpretation facility 220B may include information that affects a manner in which the interpretation is carried out and which instructions are output based on the interpretation. For example, the configuration information may configure the interpretation facility 220B to prefer particular types of instructions.

Illustrative techniques for operating such a software development tool are discussed in detail below. In the example of FIG. 2, the software modules of the trading system 218 are evaluated and modified by such a software development tool. In addition, the software development tool produces configuration information used by a scheduling facility 220B. The scheduling facility 220B may be a portion of a management facility 220 for one or more of the multicore processing units 210, 212 and may be responsible for assigning software modules for execution in parallel on the processing cores of the one or more of the multicore processing units 210, 212. In cases in which the number of software modules of the trading system 218 is greater than the number of processing cores of the multicore processing units, the scheduling facility 220B may be responsible for scheduling the software modules for execution at different times. In addition, the scheduling facility 220 may assign particular software modules to particular processing cores based on the configuration information produced by the software development tool.

In FIG. 2, the computing device 208 is illustrated as connected to a computing device 224. In the computing system 200 of FIG. 2, the software development tool that evaluates software modules of the trading system 218 and produces configuration information may be executed on the computing device 224. The software development tool may be implemented as one or more functional facilities that may execute on one or more processing units (including multicore processing units) of the computer device 224 to perform the functions of the software development tool described herein. The computing device 224, upon evaluating software modules of the trading system 218, may configure the computing device 208 based on the evaluation conducted by the software development tool. Configuring the computing device 208 may be carried out in any suitable manner. The configuration may include, for example, storing the software modules of the trading system 218 that may have been modified by the software development tool, setting configuration parameters of hardware of the computing device 208 (including the multicore processing units), and providing the configuration information to the management facility 220. The management facility 220 may then, based on the configuration information, interpret the modules to produce sets of instructions for the modules and schedule the instructions for the modules for execution on one or more cores 212A. Examples of the types of configuration that may be carried out by software development tool are discussed in greater detail below.

While FIG. 2 illustrates the computer system 200 as including one bridge 206, one computing device 208, and one computing device 224, it should be appreciated that embodiments are not limited to operating with any particular number of bridges 206, computing devices 208, and computing devices 224. In some embodiments, for example, the bridge 206, computing device 208, and/or computing device 224 may be implemented as a system of multiple devices operating together to, for example, balance a load on the bridges 206, computer devices 208, and/or computing devices 224. Additionally, in other embodiments, bridge 206, computing device 208, and computing device 224 may be implemented as a single computing device executing the functionality of these devices described above.

Additionally, it should be appreciated that while the management facility 220 of FIG. 2 was discussed in connection with the graphics processing unit 212, some embodiments may additionally or alternatively include a management facility that manages the central processing unit 210. A management facility for the central processing unit 210 may manage the unit 210, including by scheduling modules for execution on the unit 210. Further, it should be appreciated that while some embodiments, like the embodiment of FIG. 2, may include an interpretation facility 220B that interprets software modules written in one language or formatted in one manner and produces sets of instructions for the modules that may be executed by cores, embodiments are not limited in this respect. In other embodiments, software modules evaluated by the software development tool and provided to a management facility 220 or to a multicore processing unit may include instructions in a format that can be executed by cores of the multicore processing unit.

Figure 3:
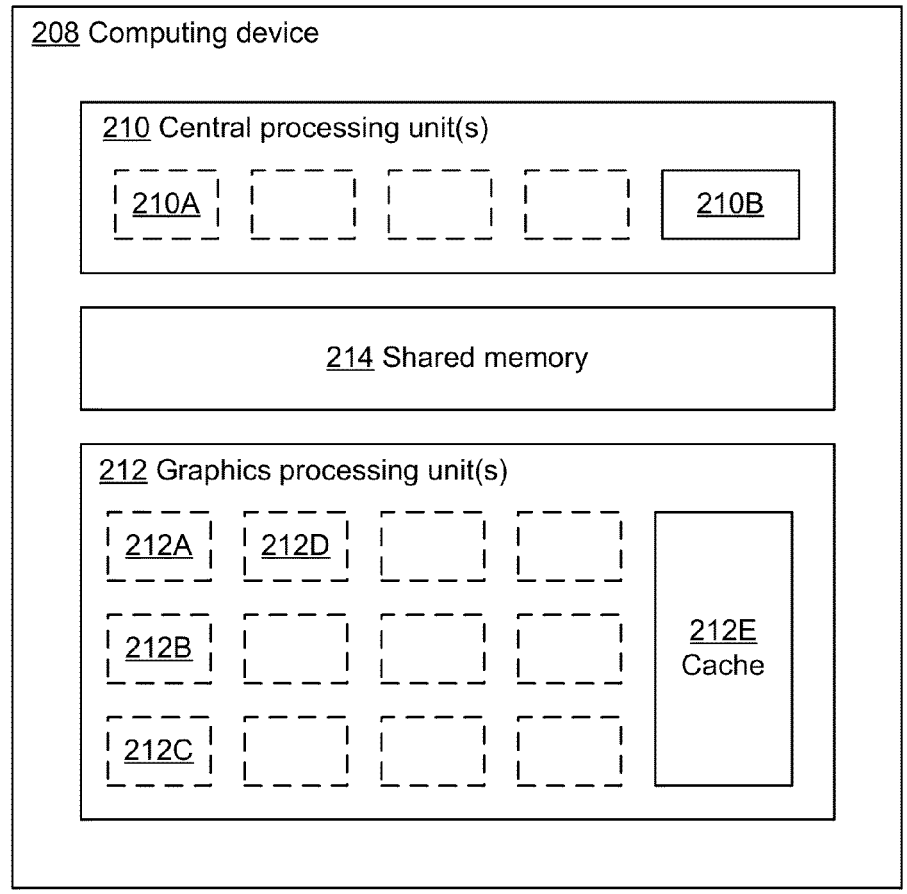
FIG. 3 is a block diagram of computing device with which some embodiments may operate.

FIG. 3 illustrates the multicore processing devices 210, 212 and storage media 214 of the computing device 208 of FIG. 2 in greater detail. As in FIG. 2, the computing device 208 is illustrated in FIG. 3 as including one or more central processing units 210, one or more graphics processing units 212, and storage media that include shared memory 214 that is shared between the central processing unit(s) 210 and graphics processing unit(s) 212. Each of the processing units 210, 212 may read data from the shared memory 214 and write data to the shared memory 214. Accordingly, the processing units 210, 212 may exchange data with one another by storing the data in shared memory 214. The central processing unit(s) 210 is also illustrated as including an on-chip cache 210B that may store data for processing by each of the processing cores 210A. Similarly, the graphics processing unit(s) 212 is illustrated as including an on-chip cache 212E that may store data for processing by each of the processing cores of the graphics processing unit(s) 212. In some embodiments, a multicore processing unit may additionally or alternatively include one or more other forms of storage not illustrated in FIG. 3. For example, each processing core 210A, 210B and each processing core 212A-212D may include a local cache that may be used by software modules that execute on the processing core. As another example, each processing core may be assigned to a block of processing cores that share access to a storage, such as sharing access to a particular memory or a particular region of memory. In some cases, the storage to which the processing cores of the block share access may be a block-shared cache that is accessible to processing cores of the block, but not accessible to other processing cores, or to which the processing cores of the block have preferred access such that the cores of the block are given priority when requesting access to the block-shared cache. Other forms of storage may also be included in a processing unit, as embodiments are not limited to operating with processing units that include any particular forms of storage.

The processing cores of the multicore processing units 210, 212 may include multiple different types of processing cores. Some of these types of processing cores may be specially adapted to execute some instructions or types of instructions. For example, one type of processing core may include one or more components that permit cores of the type to execute some instructions in a manner that is different from the manner in which cores of other types may execute those instructions. The components may permit the cores of this type to execute the instructions more quickly or more efficiently than cores of other types. Other types of cores may also include one or more components that permit those cores of other types to execute other instructions in a different manner. Each type of core may include components that permit that type of core to execute one or more instructions in a particular manner, such as by executing the one or more instructions more quickly or efficiently than other cores. The instructions a core is specially adapted to execute may be any suitable one or more instructions. In some cases, the instructions may be instructions of a particular type, such as memory access instructions or logical instructions. Cores that are of a type that is specially adapted to perform some instructions may be able to execute other instructions, but may not be specially adapted to perform these other instructions and may execute the other instructions in a manner the same or similar to the way in which the other instructions may be executed by other cores not specially adapted to execute those other instructions. The components included in cores that permit differences in execution may include hardware and/or software components. For example, a type of processing core may include hardware (e.g., arrangements of logic gates, memory, buses, and/or other electrical components) that is not included in other types of processing core and that permits the type of processing core to execute some instructions quickly or efficiently. For example, processing cores of a central processing unit 210 may be configured to execute a variety of different instructions, including arithmetic instructions and logical instructions. In some embodiments, however, the processing cores of a central processing unit 210 may not be specially adapted to execute any particular instructions more quickly or efficiently than others, but instead may be generally adapted to execute the arithmetic and logical instructions. In contrast, processing cores of a graphics processing unit 212 may be specially adapted to execute one or more particular types of instructions. For example, many of the processing cores of a graphics processing unit 212 may be processing cores 212A that are specially adapted to execute arithmetic operations, including vector operations, quickly and efficiently, but may not be able to execute logical instructions with the same quickness or efficiency. Logical operations may include comparison operations, Boolean operations, and conditional operations. Some of the processing cores of a graphics processing unit 212, however, may be adapted to execute logical instructions more quickly and efficiently than the processing cores 212A of the graphics processing unit 212. Processing cores 212B of FIG. 3, for example, may be adapted to execute logical operations more quickly and efficiently than processing cores 212A. However, in some graphics processing units, processing cores 212B may not be able to execute logical operations as quickly and efficiently as processing cores 210A of central processing unit 210. Processing cores 212C of a graphics processing unit 212 may be specially adapted to perform memory access operations to read and/or write data to the on-chip cache 212E more quickly and efficiently than other processing cores of a graphics processing unit 212. Similarly, processing cores 212D may be specially adapted to perform memory access instructions to read and/or write data to the shared memory 214 more quickly and efficiently than other processing cores of a graphics processing unit 212. As another example of the ways in which processing cores may be adapted to perform different types of operations, processing cores of a central processing unit may be capable of performing operations for communicating via a communication network, such as by sending information to or receiving information from a network interface of a computing device of which the processing core is a part. In some graphics processing units, however, processing cores may not be capable of performing such operations for communication via a network, such as because the processing cores may not be capable of communicating with a network interface. Other processing cores may be specially adapted to execute other types of instructions.

A software development tool, operating according to techniques described herein to evaluate software modules of a complex processing system (such as a trading system to evaluate trading information and identify desirable trades) may produce configuration information dependent in part on such special adaptations of processing cores. In some embodiments, a software development tool may be configured with information regarding different types of special adaptation of processing cores of different types of multicore processing units, including central processing units, graphics processing units, FPGAs, or other forms of multicore processing units. When such a software development tool evaluates software modules to be executed on multicore processing units, as discussed in greater detail below, the software development tool may account for the special adaptation of processing cores when producing configuration information. For example, a software development tool may be provided with information regarding target hardware on which the software modules are to be run, and the software development tool may evaluate the software modules based on special adaptations of processing cores of the multicore processing units of the target hardware.

As discussed in greater detail below, the software development tool may account for differences between processing cores in selecting instructions to be included in software modules and/or by influencing scheduling of modules for execution on processing cores.

For example, in some embodiments the software development tool may change instructions included in a software module based on capabilities of a processing core on which the module may efficiently execute. The software development tool may change the instructions by exchanging one or more instructions included in the module for one or more other instructions that may execute more quickly and efficiently on a particular type of processing core. In embodiments in which the software development tool evaluates software modules include instructions formatted according to an intermediate language that are not executable by processing cores, the software development tool may influence a manner in which an interpretation facility selects instructions based on the intermediate language. For example, the software development tool may exchange instructions of the intermediate language in the module for other intermediate-language instructions that, when interpreted by the interpretation facility, would result in the interpretation facility outputting one or more instructions that would be quickly and efficiently executed by a processing core. As another example, the software development tool may influence a manner in which the interpretation facility interprets instructions of the intermediate language, and thereby affect which instructions the interpretation facility chooses as corresponding to instructions of the intermediate language. For example, the configuration information may configure the interpretation facility to prefer, when interpreting a software module, instructions that will execute quickly and efficiently for a particular type of processing core on which the software module is to be executed.

The software development tool may, in some embodiments, influence scheduling of software modules for execution on processing cores based on differences between processing cores. For example, the software development tool may produce configuration information including scheduling information that identifies that particular software modules or types of software modules should be assigned by a scheduling facility for execution to processing cores having particular adaptations. For example, a type of software module that includes particular instructions or operations may be assigned to a processing core that is able to carry out those instructions/operations more quickly or efficiently.

By influencing the instructions of a software module that will be executed and/or by causing software modules to be assigned by a scheduling facility to processing cores based on the types of instructions to be executed by the software modules, the software development tool may be able to configure multicore processing units of low-cost hardware to quickly and efficiently execute instructions for complex problems.

A software development tool operating in accordance with techniques described herein may be implemented in any suitable manner and may carry out any suitable operations to evaluate software modules for execution on multicore processing units. Examples of ways in which the software development tool may be implemented are discussed in detail below, though it should be appreciated that each of the examples below are merely illustrative of ways in which such a software development tool may be implemented, and embodiments are not limited to being implemented according to any one or more of the examples described below.

Figure 4A:
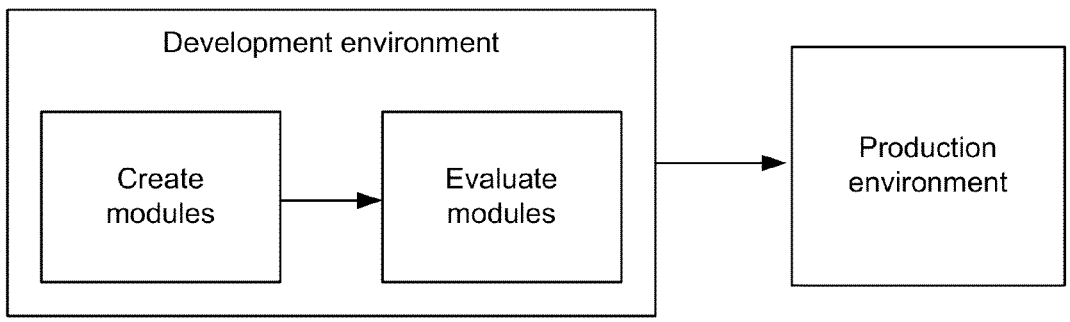
FIG. 4A is a block diagram of a software development environment in which some embodiments may operate.

FIG. 4A illustrates an example of an environment in which a software development tool operating according to techniques described herein may be implemented and may be used. The computing environment of FIG. 4A includes two environments, a development environment and a production environment, which represent two different primary phases of software development. In the development environment, software is designed, written, tested, and otherwise created. In the production environment, the software that was created in the development environment is executed on one or more processing units and performs the functions for which the software was designed.

Multiple different tools may be used in a development environment for creating software. For example, code editing tools, build/compiling tools, debugging tools, configuration management tools, and other tools may be used in the development environment as development tools for developing software modules. Once software modules have been developed using the development tools of the development environment, the software modules that were developed may be evaluated using one or more evaluation tools. Evaluation tools for evaluating software modules that have been developed may include tools for determining code coverage, memory management, and otherwise evaluating properties of the code or properties of the execution of the software modules. In accordance with techniques described herein, the evaluation tools of a development environment may also include a software development tool for analyzing software modules of a complex system to determine how to quickly and efficiently execute instructions for a complex problem on low-cost hardware, including on processing cores of one or more multicore processing units. The evaluation tools may be designed to evaluate software modules using a test environment that mimics the production environment in which the software modules may be executed. This may be done so that configuration decisions made by the software development tool in the development environment, which may be made so as to increase efficiency and speed of execution in the development environment, may be applied in the production environment to increase efficiency and speed of execution in the production environment.

Examples of operations that may be carried out by a software development tool to determine how to execute software modules for a complex problem quickly and efficiently are discussed in detail below. In general, the software development tool may evaluate source and/or object code of software modules of a complex system to determine how to configure target hardware on which the software modules will be executed in the production environment to quickly and efficiently execute instructions of the software modules. In some embodiments, software modules that are evaluated by a software development tool may be evaluated when written in an interpreted language or a semi-compiled state. For example, once code is written for the software modules, rather than leaving the code in a source language or in an object code language corresponding to target hardware, the code may be translated into another language that the software development tool is configured to review. By using an interpreted or semi-compiled language, the software development tool can review different software modules written in different source languages and for different target hardware without needing to be configured to understand each of the available language or hardware options.

Following the evaluation of the software modules, the software development tool may produce configuration information for configuring the target hardware of the production environment. The configuration information produced by the software development tool may include any suitable information for configuring target hardware to execute instructions for the complex system. The configuration information may include the software modules to be interpreted and/or executed, which may have been generated and/or edited by the software development tool as discussed below. The configuration information may also include any suitable information that may be used by an interpretation facility and/or by a scheduling facility of a multicore processing unit for determining processing cores to which to assign software modules for execution and times at which to assign the software modules to the processing cores for execution.

Figure 4B:
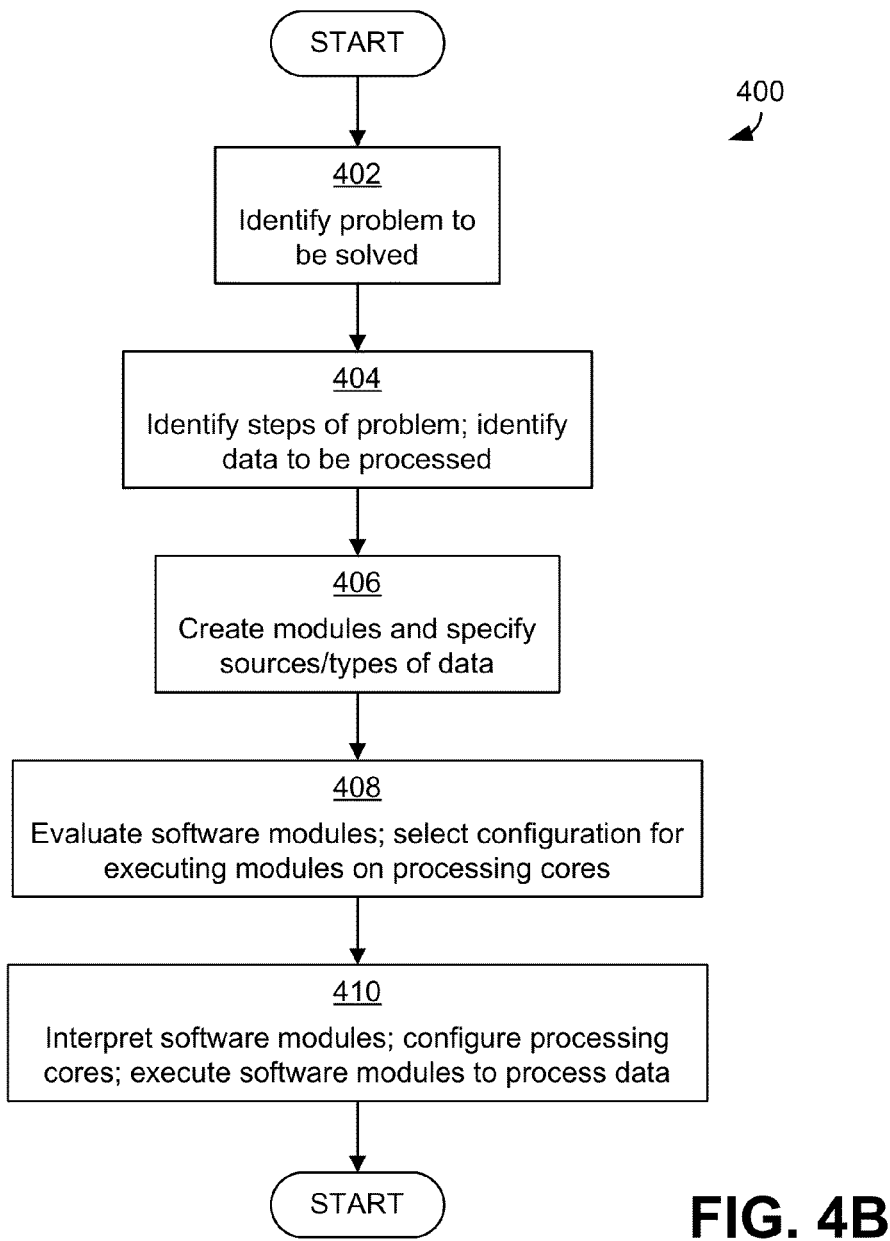
FIG. 4B is a flowchart of a software development process that may be performed in some embodiments.

FIG. 4B illustrates a software development process that may be carried out in some embodiments in the environment illustrated in FIG. 4A. It should be appreciated, however, that embodiments are not limited to carrying out a software development process like the one illustrated in FIG. 4B, and that embodiments are not limited to carrying out a software development process in the illustrative environment illustrated in FIG. 4A.

The process 400 of FIG. 4B begins in block 402, in which, during a design phase of a software development process, software developers identify a complex problem to be solved. The complex problem may be any suitable problem that may require multiple operations to be carried out and that may require that operations be carried out on multiple different pieces of data. The problem may be one that is designed to be solved once through a single execution of operations to produce a solution, or may be a problem that is designed to be solved repetitively for different input data. A repetitive problem may be, for example, a problem for which operations may be repeated each time a condition is met, such as by producing a solution in response to receiving new data in a stream.

Once the complex problem to be solved is identified, in block 404 the software developer identifies the steps of a solution to the problem and identifies the one or more pieces of data to be processed in the problem. Techniques described herein for operating low-cost hardware to execute operations quickly and efficiently for complex problems may operate in any suitable manner with problems that are complex in any way. In many cases, complex problems for which techniques described herein may be useful may be complex for one of two reasons: the complex problems include multiple different types of operations that are to be carried out, or the complex problems include multiple different pieces of data that are to be processed. In some cases in which complex problems are complex because they include multiple different types of operations, the multiple different types of operations may be performed on a relatively small data set, with low variability in the data or types of data to be processed by different operations. In some cases in which complex problems are complex because they include multiple different pieces of data, multiple different pieces of data may be processed using a relatively small set of operations, with low variability in the types of operations to be carried out for different pieces of data.

In accordance with techniques described herein, once the software developer identifies the steps of the solution to the problem and identifies the data to be processed, the software developer creates software modules to be executed and specifies the sources of data to be processed by each of the software modules. Speed and efficiency of execution may be increased when operations are executed on a multicore processing unit by designing the operations to be executed in parallel, which can be achieved by separating operations into different software modules. By separating operations into different software modules, the different modules may be executed in parallel, at the same time, which may increase speed and efficiency of execution. Accordingly, a software developer may create multiple different software modules that each include instructions for carrying out some of the operations that form a part of the solution to the complex problem and that may each perform processing on some of the data to be processed as part of the complex problem. Each of the software modules may also be configured to receive the data from a particular source, or to receive a particular type of data formatted in a particular manner.

As discussed above, however, creating software modules for quick and efficient execution on low-cost hardware is difficult and may require intimate knowledge of the operations of multicore processing units and the manner in which a multicore processing unit executes particular instructions or types of instructions. Accordingly, when the software developer creates the software modules and specifies the type/source of data to be processed by each of the software modules, the software developer may not have created the modules and specified data in a manner that would result in quick and efficient execution of the software modules on a multicore processing unit. Rather, in some cases, the software modules created by the software developer may execute slowly on a multicore processing unit.

Software modules may execute slowly on a multicore processing unit for any of a variety of reasons. As one example, if instructions are divided into software modules too finely, this may result in a very large number of software modules each executing a relatively small number of instructions. In some cases, the number of modules may exceed the number of cores of a multicore processing unit. To execute the software modules, then, a scheduling facility for a multicore processing unit may perform context switches on processing cores to configure a core to execute different modules at different times. When there is a large number of software modules, the scheduling facility may have to carry out a large number of context switches. When a software module is to be executed and a context switch is performed, the instructions of the software module are made available to the processing core and data to be processed by that software module is made available to the processing core. The instructions and data may be made available by loading each into an on-chip cache of the multicore processing unit or of an individual processing core, or in any other suitable way. Additionally, as part of the context switch, the instructions and data for a prior software module may be moved from a storage for a processing core to another storage, such as from an on-chip cache to a system memory. Performing such a context switch by loading and unloading instructions and data may take a relatively long time and the multicore processing unit may not execute instructions during context switches, which may result in delays of execution. When context switches have to be performed a large number of times, the delays for each context switch can result in execution times for software modules that are very long.

As another example of a reason software modules may execute slowly, memory access operations to read and/or write data to memory may take a relatively long time to execute on a processing core. The operations may execute relatively slowly when data to be read from memory is not available in a local cache for the processing core that is to process the data and the data is retrieved from another cache or system memory for a device. Because of delays due to memory access operations, software modules that perform a large number of memory access operations for relatively small amounts of memory may take a relatively long time to execute. This may result in delays as a processing core may not execute another module while waiting for a memory access operation to complete, but instead may wait for the operation to finish.

As a third example of a reason software modules may execute slowly, exchanging information between a central processing unit and a graphics processing unit on a computing device may take a relatively long time as compared to memory access operations that are performed entirely within the central processing unit or entirely within a graphics processing unit. Accordingly, software modules that perform a large number of operations to exchange data between a central processing unit and a graphics processing unit may take a relatively long time to execute due to the time spent exchanging data. This may resulting in delays as the processing core waits for the operations to complete rather than executing another module or operation. As an example of such exchanges, in some contexts, operations executed by a graphics processing unit may result in information to be communicated via a network. Because a graphics processing unit may not be able to operate a network interface to carry out the communication, the graphics processing unit may communicate with a central processing unit. The CPU may in turn effect the communication over the network. Because of the delay caused by exchanging information between a graphics processing unit and a central processing unit, execution of operations to determine whether to communicate via the network and operations to communicate via the network may take a long time to execute.

As another example of a reason that software modules may execute slowly, in some embodiments, a management facility for a multicore processing unit may not permit software modules to be provided to the management facility formatted using instructions that can be executed by cores of the multicore processing unit. Instead, the software modules may be provided to the management facility using a different language, such as an intermediate language. In these embodiments, as discussed above, an interpretation facility of the management facility may interpret the instructions formatted using the intermediate language of the input software modules and produce, as output, corresponding software modules that include sets of instructions that can be executed by the cores. If the instructions in the intermediate language include instructions that do not correspond to instructions that will execute quickly or efficiently on target hardware, the software modules, once interpreted, may execute slowly.

These difficulties in executing software modules on multicore processing units may be alleviated by creating software modules in particular ways given the types of instructions to be executed by the software modules or the types of data to be processed by software modules. For example, if a large number of different operations is to be conducted on the same pieces of data (such as when a complex problem is complex due to including a wide variety of operations, but not a wide variety of data), constructing software modules that include multiple different types of operations conducted on one piece of data may be beneficial. This may be because the large number of different operations within a module reduces the number of software modules that are constructed, reducing the number of context switches that must be carried out during execution of the software modules. Additionally, performing multiple different operations on data following one or a few memory access operations in a software module to retrieve that data may result in fewer memory access operations overall. By reducing the number of context switches and reducing the number of memory access operations, combining operations into fewer software modules may increase the speed and efficiency of execution of software modules. This may be so, despite that a common approach may be to separate the different operations into different software modules so as to increase the ability of these different operations to be performed in parallel.

Additionally, as discussed above, different processing cores of a multicore processing unit may be specially adapted to execute different types of instructions quickly and efficiently. For example, one processing core may be adapted to execute logical operations more efficiently than another processing core, and one processing core may be adapted to execute memory access operations more efficiently than another processing core. As such, configuring a multicore processing unit to execute different software modules on particular processing cores of the multicore processing unit based on the instructions included in a software module may be advantageous. For example, when a software module includes a certain type of instructions, a multicore processing unit may be configured to execute that software module on a certain type of processing core. By doing so, software modules with particular types of instructions may execute on certain types of processing cores. The software modules may therefore execute more quickly and efficiently.

Also, when operations that together form a solution of a complex problem are divided into multiple different software modules, in some cases some of the software modules may include operations that should be executed after operations of other software modules. For example, a software module may accept as input processed data output by another software module, and may produce further processed data as output, which may in turn be provided to another software module. In such a case, if a scheduling facility is not provided with information identifying a dependency between software modules, the scheduling facility may assign a software module to execute on a processing core before another software module on which it depends. In such a case, the dependent software module may wait for the input from the other software module, and delay execution until the other software module executes and provides the input. Identifying dependencies between software modules and making a scheduling facility aware of the dependencies, such that a scheduling of execution of software modules accounts for the dependencies, can also lead to a more quick and efficient execution of software modules.

Further, as discussed above, different instructions may execute differently on processing cores of one or more multicore processing units, with some instructions executing more quickly or efficiently than others. Some types of processing core may execute some instructions more quickly or more efficiently than other types of processing core. An interpretation facility for a multicore processing unit may be adapted to evaluate intermediate language instructions and identify an efficient set of instructions that corresponds to the intermediate language instructions and can execute on processing cores. However, the interpretation facility may be arranged with default rules for interpretation that may generally result in efficient sets of instructions. These rules for interpretation may not, however, result in efficient sets of instructions for a particular software module. In some embodiments in which an interpretation facility interprets intermediate language instructions, the interpretation facility may be able to accept input that configures the interpretation that is to be performed, including by indicating that particular types of instructions should be preferred or should be avoided. For example, in some cases a default rule of an interpretation facility may indicate that Single Instruction, Multiple Data (SIMD) instructions should be created during an interpretation wherever possible, as SIMD instructions may, in general, be executed efficiently. The interpretation facility may also accept input, however, that identifies that SIMD instructions should not be used or should not be used. Additionally, the interpretation facility may output different instructions based on different intermediate language instructions that are input. Thus, the instructions that cause a processing core to carry out an operation that are output by the interpretation facility may vary based on which instructions describing the operation are input to the interpretation facility. Thus, by providing configuration inputs or particular intermediate language instructions to an interpretation facility, a particular set of instructions, which may not normally be produced by the interpretation facility, that may execute quickly or efficiently in a particular context may be produced.

However, software developers that are not intimately familiar with the multicore processing units for which they are developing software may not be aware of advantages and disadvantages that may result from the different ways of dividing operations into software modules, for configuring a multicore processing unit for executing the software modules, or for specifying instructions for execution. Thus, software developers who are developing software modules for parallel execution on low-cost multicore processing units may benefit from a software development tool that evaluates software modules that have been created and are intended to be executed on one or more multicore processing units to determine whether the software modules created by a developer will execute quickly and efficiently. The evaluation may be carried out based on any suitable factors, including by analyzing the software modules individually or collectively in view of any of the difficulties in creating software modules for parallel execution mentioned above. Determining whether the modules will execute quickly and efficiently may include evaluating the instructions included in the modules, evaluating the data to be processed by the modules, and/or evaluating a collection of software modules and the manner in which the software modules interconnect and communicate with one another. The evaluation may include evaluating the modules in storage and/or evaluating the modules during execution of the modules by processing cores of one or more multicore processing units. Such a software development tool may evaluate the modules created by the software developer and may determine whether the software modules will execute quickly and efficiently on specified target hardware for the software modules. The software development tool may automatically edit the software modules as a result of this evaluation. Editing the software modules may include editing an individual software module and/or editing the collection of software modules and/or the interconnections between the software modules. Editing the software modules may also include changing instructions included in a software module, such as by changing intermediate language instructions included in the software module, which may change the instructions that are output from an interpretation facility. In addition to or as an alternative to automatically editing software modules, the software development tool may produce information to be provided to the software developer as suggestions of how to change the software modules to improve the speed or efficiency of execution of the software modules. Further, the software development tool may produce configuration information for configuring target hardware, including one or more multicore processing units, for execution of the software modules.

Accordingly, in block 408 of FIG. 4, the software modules created by the software developer in block 406 and the types of data specified in block 406 are evaluated using a software development tool. As a result of the evaluation, the software development tool produces configuration information. In block 410, one or more multicore processing units and the processing cores of the multicore processing unit(s) in a production environment are configured with the configuration information. In embodiments in which an interpretation facility creates sets of instructions for the software modules from instructions arranged in an intermediate language or another format that is not executable by processing cores, the interpretation facility may create the instructions for the modules in block 410. Then, in block 410 the processing cores may execute the software modules to perform processing on data provided to the cores.

Once the processing cores are configured and executing software modules in block 410, the process 400 ends. Following the process 400, the multicore processing unit(s) are able to execute operations for a complex processing system and may process the data to produce a solution to the complex problem.

As discussed above, techniques described herein may be used with any suitable type of complex problem. One type of complex problem for which software modules may be developed and for which software modules may be analyzed using a software development tool as described herein is financial arbitrage.

Figure 5:
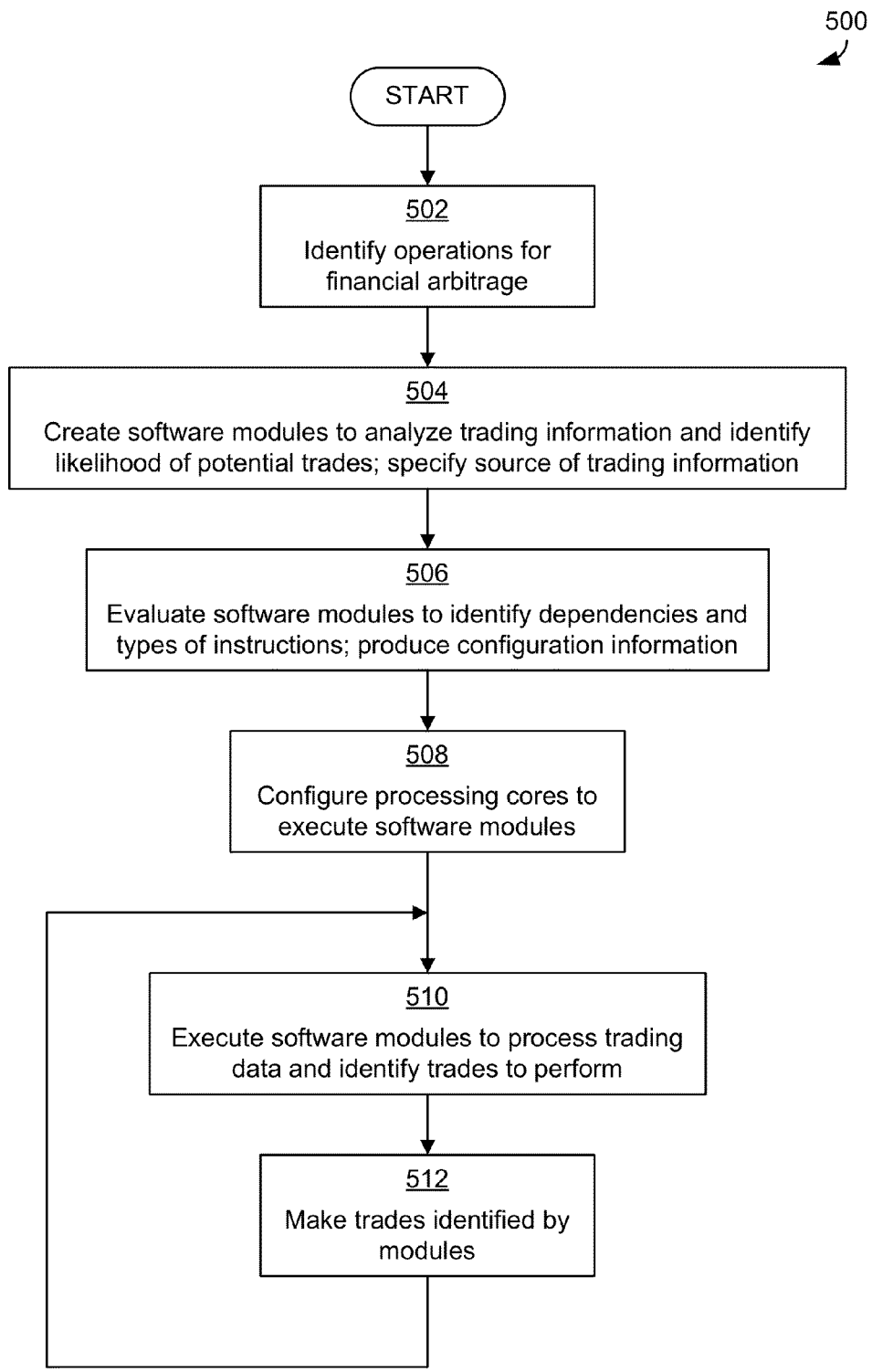
FIG. 5 is a flowchart of an exemplary process for developing and executing software modules for financial arbitrage.

FIG. 5 illustrates an exemplary process 500 for developing software modules for execution on one or more multicore processing units to perform operations of a trading system for financial arbitrage. The process 500 of FIG. 5 is a specific example of the exemplary process 400 of FIG. 4.

The process 500 begins in block 502, in which a software developer identifies, for the trading system to be created, the processing steps included in evaluating sequences of potential trades in a financial arbitrage setting and the data to be evaluated. The data to be processed in a trading system may include trading information received for potential trades with banks or other counterparties to potential trades (e.g., information received from source of data 202A of FIG. 2) as well as information maintained by an operator of the trading system. Examples of the types of information regarding potential trades that may be received are described above. Information maintained by an operator may include information regarding previous trading activity and/or predictions regarding future activity. Information on previous trading activity may include information regarding recent trades and recent denied trades. Information on predictions regarding future activity may include predictions regarding counterparties to potential trades, including whether the counterparties are expected to approve trades in the future. In some cases, if information on previous trading activity indicates that a counterparty has been denying trades, predictions on future trading activity may identify that the counterparty is expected to deny trades. The processing steps for financial arbitrage may include identifying an anticipated profit associated with a sequence of trades of currencies and identifying a likelihood of the sequence of trades being approved by each counterparty of each trade included in the sequence of trades.

Once the steps of the solution and the data to be processed have been identified by the software developer, in block 504, software modules for the steps are created manually and/or automatically. In some embodiments, as discussed below in more detail in connection with FIGS. 6 and 8, template processing modules may be created manually and modules that are instances of the template may be created automatically. In addition, in block 504, the software developer specifies types of data to be evaluated by the software modules. The software developer may create software modules in block 504 that perform operations for determining an anticipated profit associated with a sequence of trades and that perform operations for determining a likelihood of a sequence of trades being approved and/or completed. Software modules may be created for each of the permutations of trades and sequences of trades, such that the financial arbitrage operations are carried out on each potential trade indicated by trading information. Additionally, the software developer may specify the sources of data to be processed by each software module. The sources may include sources providing trading information for banks and other potential counterparties from which trading information may be received and may identify each type of data that may be received from these sources.

In block 506, a software development tool evaluates the software modules created and the types of data specified by the software developer. In evaluating the software modules created by the software developer, the software development tool may identify dependencies between the software modules. For example, the software modules for financial arbitrage may, in some implementations, include one or more modules to calculate anticipated profits associated with potential trades and one or more modules to calculate, based on the profits of individual trades, anticipated profits associated with potential sequences of trades. The software development tool, upon evaluating these modules, may identify that a module for calculating an anticipated profit associated with a sequence of trades is dependent on one or more modules that calculate anticipated profits associated with each of the trades in the sequence. The software modules for financial arbitrage may also, in some implementations, include modules that include primarily arithmetic instructions, such as calculating anticipated profits, and modules that include primarily logical instructions, such as for comparing potentials for profit between different potential sequences of trades to select a sequence of trades to execute. In some embodiments, processing cores of one or more multicore processing units may have different capabilities and/or configurations, and thus some cores may be able to execute some types of instructions more efficiently than other cores. The software development tool may identify that the modules should be assigned to particular processing cores based on the types of instructions. The software development tool may identify that some of the modules should be assigned for execution to processing cores that are specially adapted for arithmetic operations and others of the modules should be assigned for execution to processing cores that are specially adapted for logical operations. The software development tool may carry out a similar process when the target hardware that is to execute the modules that select a trade for execution is a first processing unit without access to a network interface (e.g., a GPU without access to a network interface) and a bridge is not operating locally on the computing device. In implementations of a trading system that operate in such an environment, software modules of the trading system may include a module to communicate an identification of a sequence of trades to be executed to a second processing unit that has access to a network interface (e.g., a CPU). When the hardware with access to the network receives the identification of the sequence of trades, a module or other part of the trading system executing on the second processing unit may execute the sequence of trades, such as by communicating via a network to instruct a bridge to execute the sequence. In some embodiments, therefore, one or more of the software modules may therefore execute instructions to transfer data between a first processing unit and a second processing unit. Upon evaluating the instructions of that software module, the software development tool may identify that the software module should be assigned for execution to a processing core of the first processing unit that is specially adapted for accessing shared memory that is accessible by the second processing unit. In addition to evaluating the instructions to identify processing cores on which a software module should execute, the software development tool may evaluate the instructions to determine how to configure an interpretation performed by an interpretation facility. In embodiments in which an interpretation facility interprets instructions of a software module that are formatted in one way and produces sets of instructions that are executable by processing cores of a multicore processing unit, the software development tool may configure the interpretation to be performed in a particular manner based on the evaluation of the instructions of the software modules.

Other forms of evaluation, and specific techniques for conducting the evaluation, are discussed in detail below in connection with FIGS. 8-9.

As a result of the evaluation of block 506, the software development tool may output configuration information for use by one or more management facilities for one or more processing units, and/or may output suggestions to a software developer on how to edit the software modules to improve execution efficiency. The configuration information may include any suitable information, including information on dependencies and relative times at which software modules should be executed and information on processing cores to which software modules should be assigned.

In block 508, the multicore processing unit(s) and the processing cores may be configured according to the configuration information output by the software development tool. Configuring the multicore processing units may, in some embodiments, include configuring an interpretation performed by an interpretation facility. Configuring the multicore processing unit(s) may also include providing information regarding processing cores to which to assign software modules, dependencies between software modules, or any other suitable information regarding how software modules are to be scheduled for execution, to one or more scheduling facilities of the multicore processing unit(s). Once the scheduling facilities have the configuration information, the scheduling facilities may create a schedule for execution of the software modules according to the configuration information and cause processing cores to be programmed with software modules according to the schedule.

Once the multicore processing unit(s) are configured, in block 510 the multicore processing unit(s) may begin executing the software modules to process trading information and select sequences of potential trades to execute. The sequences of potential trades to execute may be selected based on potential for profit associated with each of the sequences of trades. The potential for profit of a sequence of trades may be based on an anticipated profit associated with the sequence, if the sequence is completed, as well as the likelihood of the potential trades included in the sequence being approved by the counterparties to those potential trades. The likelihood for the sequence may be determined based on information regarding past trading activity, current trading activity, and/or future trading activity. Information regarding past trading activity may include information regarding potential trades that were not selected for execution, potential trades that were selected and were not denied and not executed, and/or potential trades that were selected and were executed. Information regarding current trading activity may include information regarding the potential trades that may be selected, such as a source or age of the information regarding the potential trade. Information regarding future trading activity may include predictions regarding future trades based at least in part on past trades, such as information identifying that a particular counterparty is expected to deny trades in the future. Other criteria may additionally or alternatively be used to identify and select desirable sequences of trades for execution, as embodiments are not limited in this respect. One or more modules of the software modules may apply these criteria and select, from among the processing chains and the sequences of potential trades, one or more sequences of potential trades to execute.

In block 512, once a sequence of trades has been selected by the modules in block 510, the trades included in the selected sequence of trades may be executed. To execute trades, in some embodiments the software modules of the multicore processing units may issue an instruction to another software facility of a trading system to identify that trades of a sequence of trades should be executed, and the software facility may execute the trades. In some embodiments, to execute the trades, the software facility may communicate with a bridge. The bridge may be one executing on a separate computing device, as in the example of FIG. 2, or may be one executing on the same computing device as is executing the software modules, or may be arranged for execution on any suitable computing device. Embodiments are not limited to including a bridge or to including a bridge implemented on any particular computing device.

Once the trades are executed in block 512, the process 500 may return to block 510. In block 510, the software modules again evaluate trading information. The trading information evaluated when the process 500 returns to block 510 may include previously-received trading information and new trading information that has been recently received by the trading system and that identifies new trades and/or new terms for trades. In some embodiments, software modules may not evaluate previously-received trading information and may not execute on a processing core until new trading information is received for execution by the processing core. In other embodiments, however, some or all of the trading information may be evaluated by a software module including when the trading information was received at a prior time or was previously processed by the system and/or by a user. A software module may evaluate previously-received data for any suitable reason, including that a counterparty is unlikely to deny a trade to which the previously-received data corresponds, or that the data updates infrequently and may not be out of date. The process 500 may repeat the operations of blocks 510, 512 indefinitely, continuing to execute the software modules and executing identified trades until no more trading information is available, or may stop execution in response to satisfaction of any suitable condition. Embodiments are not limited to continuing or ceasing execution of a system, including a trading system, for any particular reason.

As a result of the process 500 of FIG. 5, a multicore processing unit is configured with software modules to execute operations of a trading system for carrying out financial arbitrage. As a result of the evaluation of the modules by the software development tool and subsequent configuration of one or more multicore processing units, the software modules with which the multicore processing unit is configured may be able to execute quickly and efficiently on the multicore processing unit for processing trading information and identifying sequences of potential trades to be performed.

Figure 6:
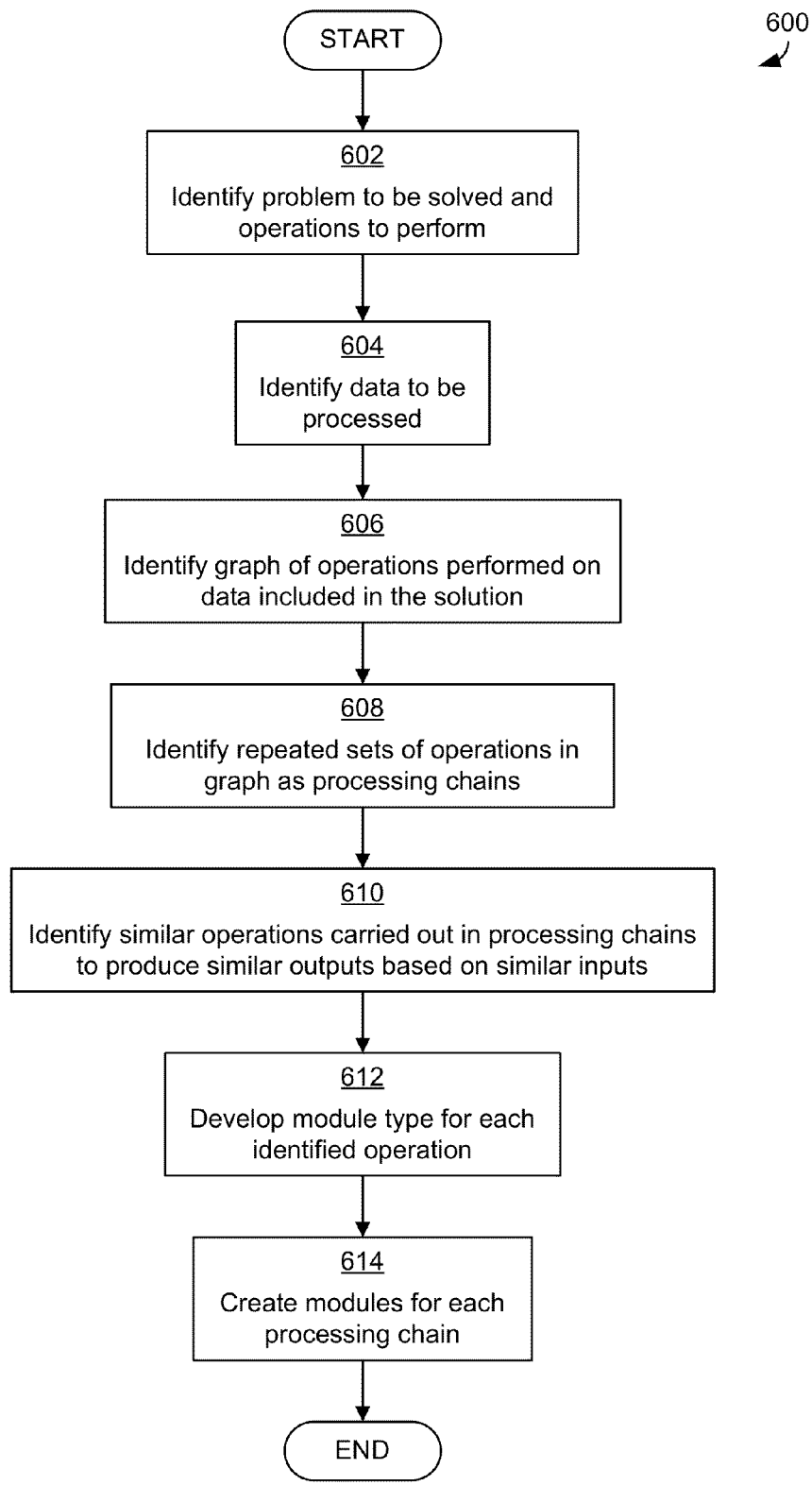
FIG. 6 is a flowchart of an exemplary process for developing software modules that may be performed in some embodiments.

It should be appreciated that software modules that include executable instructions for performing operations related to complex problems may be created with any suitable instructions based on any suitable division of operations included in a complex problem. Embodiments are not limited to dividing operations for complex problems into software modules or arranging operations for execution by processing units in any particular manner. FIG. 6 shows one illustrative process that may be used for dividing operations of a complex problem into software modules.

The process 600 begins in block 602, in which a software developer identifies the problem that is to be solved using software modules executing on one or more multicore processing units and identifies the operations to be included in a system for producing a solution to that problem. In block 604, the software developer identifies the data that will be processed by those operations. From the data that will be processed and the operations that are to be executed, the software developer may be able to identify, in block 606, a full set of operations to be included in a system for producing a solution to the problem. The system may involve combinations of the operations to be carried out and data to be processed, such that the data to be processed is processed using the operations. In block 606, the software developer identifies, from these combinations of data and operations, a complete algorithm for the solution to the problem that is an interconnected graph of the operations carried out on the data to be processed. The interconnected graph may include, as nodes, operations to be performed on data and connections between the nodes. The interconnected graph may also include, as connections between nodes, identifications of sources of inputs for nodes and destinations of outputs of nodes.

On the basis of the algorithm identified in block 606, the software developer may then be able to identify in block 608 repeated sets of similar operations performed on similar types of data. The identified repeated sets may be distinct chains of operations that are included in the algorithm for the solution. A chain may include operations that are not dependent on operations of other chains and that can therefore be executed in parallel with operations of other changes when the system for producing a solution to the problem is executed on one or more multicore processing units. Software modules that are to be executed in parallel on processing cores of multicore processing units may be defined on the basis of these processing chains that may be parallelized. For example, in block 610, the software developer reviews the processing chains to identify, between the processing chains, groups of operations that include the same or similar operations carried out on the one or more inputs that are the same or similar types of data or data from the same or similar source and that produce the same or similar one or more outputs. When such a group of operations is identified, a software module can be created from these operations that can be used as a template for subsequently building software modules for the processing chains for the algorithm.

In block 612, therefore, the software developer creates a type of software module for each of the groups of operations identified in block 610. A software module type created by the software developer in block 612 may include executable instructions corresponding to the operations of one of these groups. The executable instructions that are included in software module types created in block 612 may be any suitable instructions formatted in any suitable manner. In some embodiments, the software module types may include instructions that are executable by processing cores of a multicore processing unit. In other embodiments, the software module types may include instructions formatted according to an intermediate language that is interpreted by an interpretation facility for a multicore processing unit to produce instructions executable by processing cores of that unit. The software module type may be configured to accept input and produce output based on the types of data and/or sources of data to be processed by the operations of the group.

Operations of a system and of processing chains of the system may be divided into groups in any suitable manner. A group may include any suitable number of operations and, therefore, a software module type may correspond to any suitable number of operations. In some cases, groups of operations identified in block 610 may be able to be subdivided into smaller groups of the same operations that produce similar outputs based on similar inputs. When groups of operations may be subdivided, the software developer may include instructions corresponding to any suitable portion of the operations of a group in a software module type. The portion of the operations to be included in a software module type may be based, for example, on the types of instructions to be included in the software module type and the speed with which these instructions may execute. For example, in some cases a solution to a problem may include performing multiple different operations on a single piece of data. These operations may be identified as one group of operations. Instructions corresponding to these operations may be arranged together, in one software module type. However, arranging the instructions for all of the operations of a group in one software module type may result in slowed execution in some cases. The slowed execution may result because each instruction of the software module type waits for a prior instruction to complete when the instructions are arranged to be executed in series when a software module of the type is executed. If the operations are independent of one another, however, the operations of the group may be able to be subdivided into more groups. Efficiency of execution of instructions corresponding to the operations of the group may be improved through the subdivision of the operations into multiple different software module types. Each software module type may include only a portion of the operations in each software module type. As such, instructions for the different operations can be executed on different processing cores and parallelized when executed on a multicore processing unit. When the operations are parallelized, the operations may each be performed on the data at the same time. Parallelizing the operations may therefore increase the speed and efficiency with which the software modules execute on the multicore processing units. In some embodiments, software module types may be created using each of the smallest identifiable groups of similar operations performed on similar data to produce similar outputs that produce an intermediate result can be identified in processing chains. Using the smallest identifiable groups may increase the number of operations that are able to execute in parallel on one or more multicore processing units. In some cases, however, increasing the parallelizing of operations may not lead to the most efficient or fastest execution of those operations. Rather, in some cases, executing the operations serially in one software module may lead to the operations being executed more quickly or more efficiently. For example, in some hardware on which modules will be executed, characteristics of memory access and data transfer of the hardware may lead to a longer time spent providing data to two different modules, each requesting different data from memory and needing the data provided to processing cores executing those modules, than providing that same data to one software module executing on one processing core. Additionally, increasing the number of software modules may also increase the number of context switches that are performed when executing the modules. Context switches may create delays, as discussed above. Therefore, parallelizing may lead to a loss of efficiency or execution speed in some cases. In cases in which parallelizing would result in a loss of efficiency or execution speed, greater efficiency or speed may be achieved by placing these operations in the same software module. Thus, it should be appreciated that embodiments are not limited to dividing operations of a system into software module types in any particular manner.

Once the types of the software modules are created in block 612, the types of the software modules may be used in block 614, manually and/or automatically through a software process (such as the software development tool), as templates to create instances of the software module types for each of the processing chains identified by the software developer. Where the types of software modules are used automatically through a software process to generate instances of software modules, the generation of the software modules may be done without user input. For example, a user may trigger generation of the modules based on the template, and the software process may carry out the generation without further input from the user to perform the generation.

Each of the software modules that are instances of a software module type may be arranged with particular sources of inputs and destinations of outputs that correspond to the manner in which the software modules will be used in the system to produce a solution to the problem. The sources of inputs and destinations of outputs for a software module may include other software modules. By creating instances of the software module types, the software developer creates an interconnected set of software modules that, when executed, cause one or more multicore processing units to determine the solution to the problem. The interconnected set of software modules may correspond to the interconnected graph identified by the software developer in block 606.

Once the software modules for each processing chain are created in block 614, the process 600 ends. As a result of the process 600, a set of software modules is created that may be stored, such as on a storage (e.g., disk) of a computing device in the development environment. The modules may then be provided to a software development tool for evaluation and/or may be provided to a multicore processing unit to be executed.

Figure 7A:
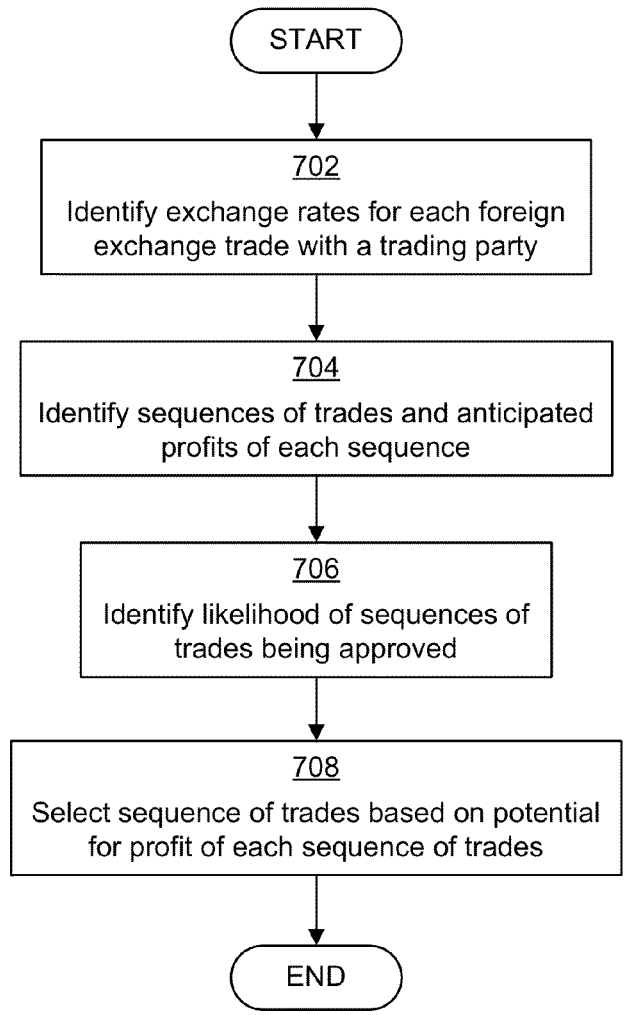
FIG. 7A is a flowchart of an exemplary process for financial arbitrage that may be performed in some embodiments.
Figure 7B:
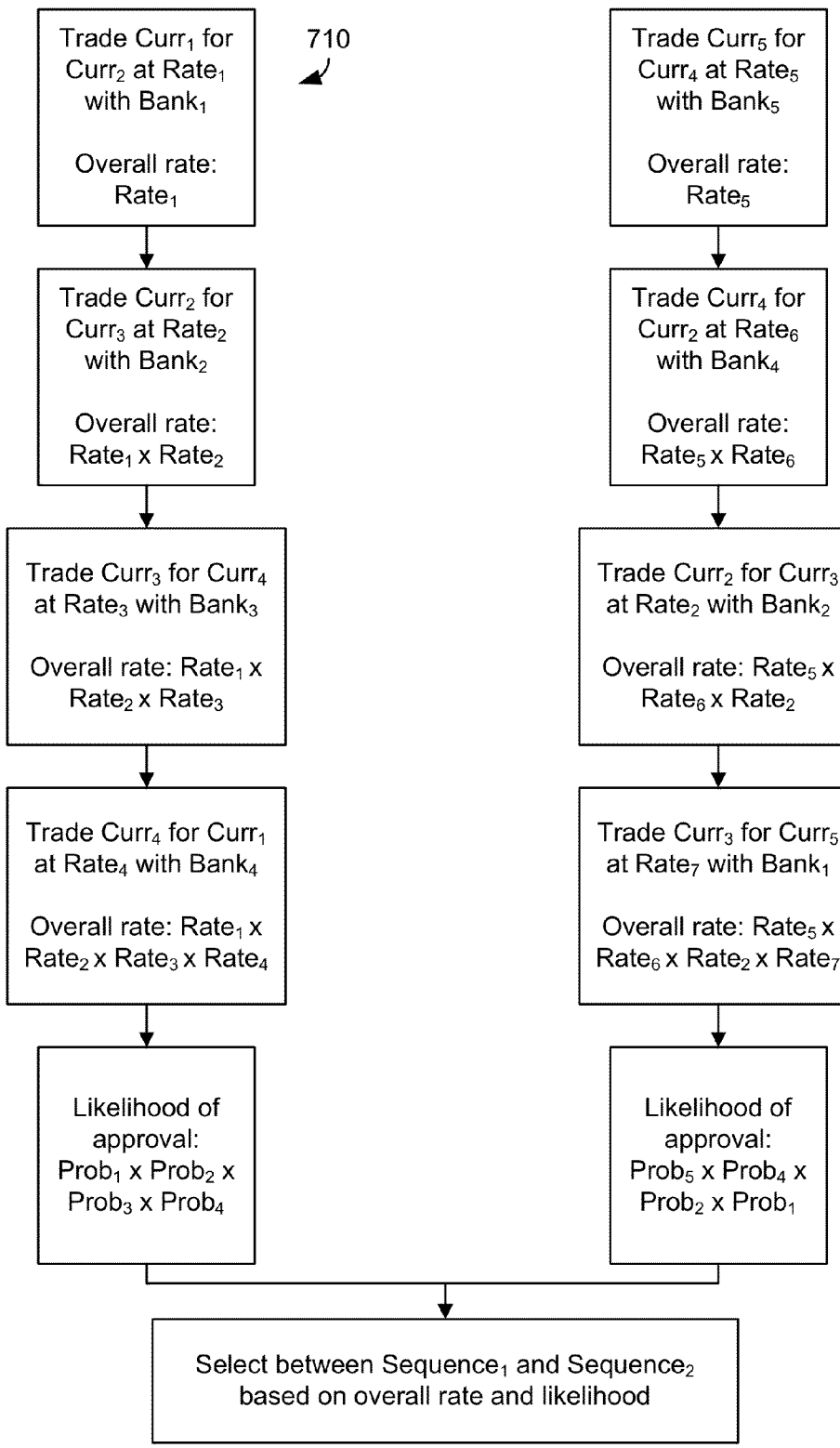
FIG. 7B is a block diagram of processing steps of the exemplary process of FIG. 7A.
Figure 7C:
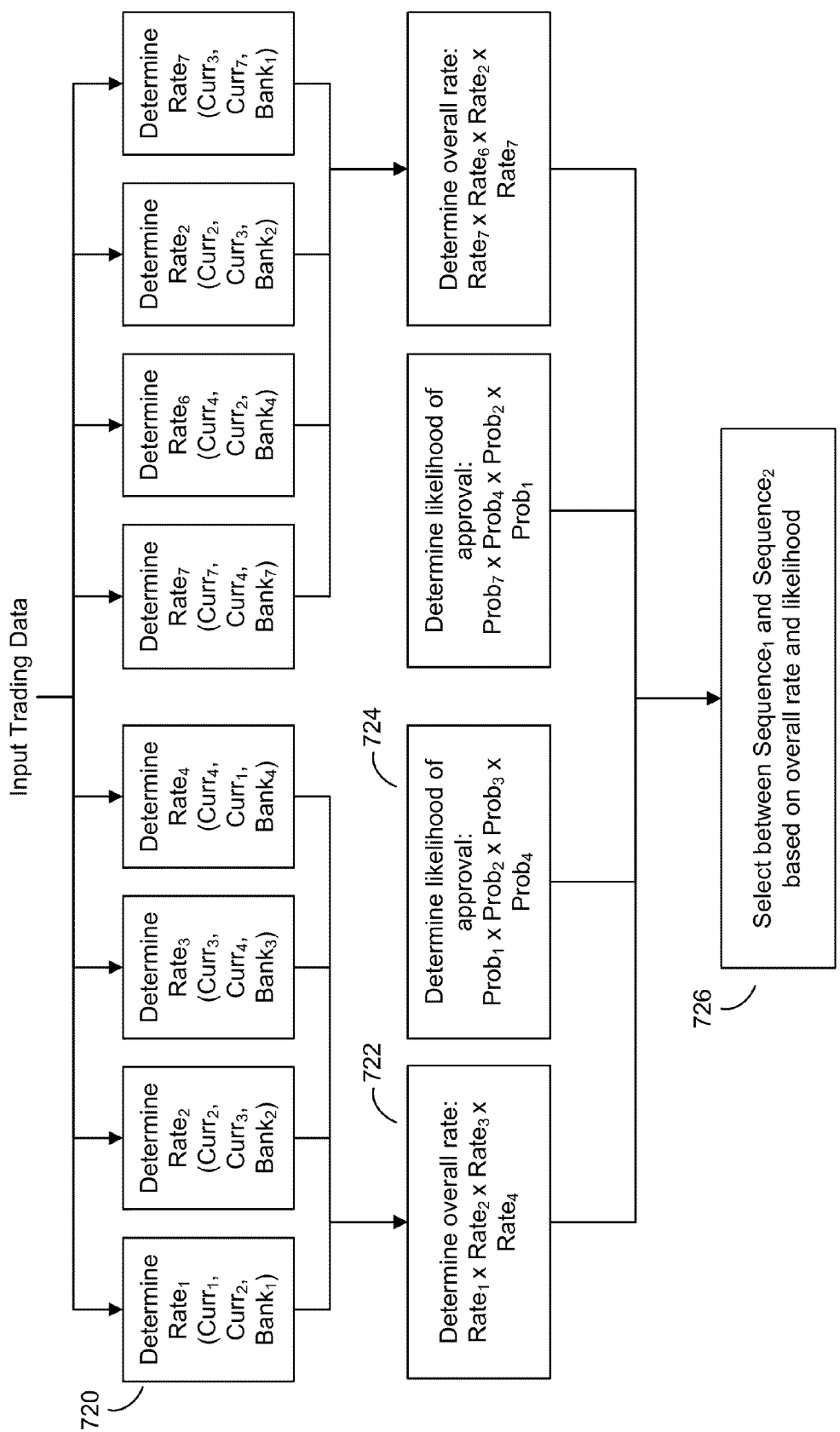
FIG. 7C is a block diagram of software modules that may be implemented to carry out operations corresponding to the processing steps of the exemplary process of FIG. 7A.

The process 600 of FIG. 6 for creating software module types and software modules was described generally, without reference to any particular problem or operations to be carried out for solving a problem. FIGS. 7A-7C continue the example of financial arbitrage discussed above and provide an example of a manner in which software module types may be created for a complex problem.

The process 700 of FIG. 7A illustrates a set of operations that may be performed by a trading system to identify, from trading information, a sequence of potential trades that should be executed. The process 700 begins in block 702, in which the trading system identifies, for each potential foreign exchange trade that a counterparty has offered to make, exchange rates for the trade. The exchange rates may be determined on the basis of trading information received from the counterparty. In block 704, the trading system identifies sequences of potential trades by identifying available combinations of potential trades. The available combinations of potential trades may be, in some embodiments, all permutations of potential trades. In other embodiments, one or more constraints may be imposed in determining which permutations of potential trades are available as sequences of potential trades. For example, a constraint may be imposed on the maximum number of potential trades to include in a sequence. As another example, a constraint may be imposed that only one potential trade per counterparty is permitted in a sequence of potential trades. It should be appreciated that any suitable constraints may be imposed, as embodiments are not limited in this respect.

Once the available sequences of potential trades are identified, the trading system may also identify for each sequence an anticipated profit associated with the sequence. The anticipated profit for each sequence may be identified on the basis of the price of each of the potential trades in the sequence, which is the exchange rate offered for each of the trades by the counterparties to those potential trades. The anticipated profit may also, in some cases, be identified on the basis of a proposed volume for a trade that is specified by a counterparty to the potential trade. However, embodiments are not limited to operating in a scenario in which a counterparty proposes a volume for a potential trade in addition to a price. Thus, in some cases in which a volume is not proposed, an anticipated profit may be identified on the basis of an exchange rate and not a volume.

The trading system may also determine, in block 706, a likelihood of each of the potential trades of a sequence being approved by the counterparties to those potential trades and, thus, the likelihood of the sequence being approved and completed. The likelihood of approval for a potential trade may be based on any suitable information, as embodiments are not limited in this respect. As discussed above, the likelihood may be based on information regarding previous trading activity, information regarding current trading activity, and/or predictions regarding future trading activity. In some embodiments, the likelihood of a potential trade being approved may be based on information including an age of the trading information identifying the potential trade, a number of recent trades made with the counterparty to the potential trade, and a number of recent rejected trades that were attempted with the counterparty. On the basis of the anticipated profit identified for each sequence of potential trades and the likelihood of approval of each sequence, the trading system may determine in block 708 a potential for profit associated with each of the sequences and select for execution one of the sequences of trades. The sequence having the highest potential for profit out of the sequences, for example, may be selected by the trading system. It should be appreciated that, in some cases, a sequence of trades having the highest potential for profit may not be the sequence having the highest anticipated profit. Rather, the potential for profit for a sequence of trades may be based on the anticipated profit as well as the likelihood of the trade being approved, such that a sequence with a high anticipated profit may not have a high potential for profit. Once the selection is made in block 708, the process 700 ends.

As discussed above in connection with FIG. 6, once a software developer has identified the operations that may be carried out as part of a solution to a complex problem, the software developer may also identify data to be processed by those operations and identify a graph of operations carried out on data that represents the algorithm that is to be executed for the solution to the problem. FIG. 7B illustrates an example of such a graph including combinations of operations and data to be processed.

The example of FIG. 7B illustrates operations including identifying exchange rates for trading currencies with counterparties (e.g., exchange rate "$Rate_1$" for exchanging currencies "$Curr_1$" and "$Curr_2$" with counterparty "$Bank_1$") and identifying a running anticipated profit for a sequence by multiplying the rates of each trade to determine an overall rate. The operations illustrated in FIG. 7B also include determining a likelihood of approval for the sequence of trades by multiplying the probabilities for approval for the individual trades of a sequence. Lastly, FIG. 7B illustrates selecting between two sequences of potential trades based on the overall rate (which may indicate an anticipated profit for the sequence) and likelihood of approval for the sequences. As discussed above, while not illustrated in the example of FIG. 7B, it should be appreciated that some trading systems operating in accordance with techniques described herein may consider a volume of a potential trade in addition to exchange rate when determining an anticipated profit associated with a potential trade and sequence of potential trades. In such embodiments, trading information received from a counterparty may identify a volume of currency that the counterparty is willing to trade at a specified exchange rate, and this volume may be considered by a trading system as part of determining an anticipated profit for a potential trade.

The process 600 of FIG. 6 also includes steps for identifying processing chains in the operations included in the graph, which were parallel sets of similar operations. As should be appreciated from the illustration, FIG. 7B includes two processing chains 710 and 712, one for each sequence of potential trades. Each of the processing chains 710, 712 includes the same sets of operations that will correspond to the same executable instructions, and these operations are carried out on similar types of data. Accordingly, as in the example of FIG. 6, these two processing chains can be evaluated to determine types of software modules to be created.

From an analysis of the operations of the processing chains, four different types of software module can be identified. These four types of software module, as well as instances of them corresponding to the data processed in the example of FIG. 7B, are illustrated in FIG. 7C. FIG. 7C illustrates a set of software modules of four different types 720-726, arranged in different rows identifying a manner in which the software modules may be parallelized. The types of software module identified from the processing chains of FIG. 7B include software modules of type 720 for identifying an exchange rate for a potential trade from trading information received from the counterparty for that potential trade. The software modules of type 720 do not depend on one another, but rather only depend for execution on receiving input trading information. Therefore, the software modules of type 720 are eligible to be executed in parallel with one another.

The software modules also include modules of type 722 that accept as input the exchange rates determined by each of the modules of type 720, process the exchange rates to determine an overall exchange rate for the sequence of potential trades, and produce as output the overall exchange rate for the sequence that represents an anticipated profit from the trade. Because the software modules of type 722 depend on modules of type 720 for input, a software module of type 722 should be executed in a multicore processing unit after the time at which the modules 720 on which it depends execute. Software modules of type 722 may, however, be executed in parallel with modules of type 720 on which the modules of type 722 do not depend. In some cases, the modules of type 722 may be executed in parallel with modules of type 724. As should be appreciated from the graph of FIG. 7C, modules of type 722 do not accept input from modules of type 724 and are therefore not dependent on modules of type 724.

The software modules of type 724 include instructions to determine a likelihood of a sequence of trades being approved and outputting the determined likelihood. The software modules of type 724 are not illustrated in FIG. 7C as being dependent for input on other software modules, and may therefore be executed in parallel with modules of type 720, in parallel with modules of type 722, or before or after modules of types 720 or 722. Lastly, the types of modules included in the example of FIG. 7C include a type 726 that evaluates the sequences of potential trades to identify desirable sequences of potential trades. The evaluation module of type 726 selects one or more sequences of potential trades to execute. To do so, the evaluation module of type 726 may accept as input the overall rate of exchange for a sequence of potential trades and a likelihood of a sequence of trades being approved from two different sequences, compares the potential for profit associated with each sequence of potential trades, and selects a sequence of trades to be performed that has the highest potential for profit. In the embodiment of FIG. 7C, the potential for profit of a sequence of potential trades is determined by the module of type 726 by weighting an anticipated profit of a sequence of trades by the likelihood of the sequence of trades being approved and completed. The sequence of trades having the highest potential for profit may therefore be identified as the sequence of trades having the highest weighted anticipated profit. Thus, the sequence of trades having the highest potential for profit may not be the sequence having the highest anticipated profit.

The four types of software module 720-726 of FIG. 7C may form a template for a processing chain for a financial arbitrage problem. Each processing chain includes operations corresponding to these four types of software module. By creating instances of each of these four types that are configured with particular sources of inputs and particular destinations of outputs, which tie the software modules together when the inputs and outputs are other software modules, the graph shown in FIG. 7C, which represents the operations of a system for producing a solution to the financial arbitrage problem, can be created.

In accordance with techniques described herein, software modules and/or types of software modules for a solution to a complex problem may be evaluated by a software development tool. The software development tool may evaluate the modules in any suitable manner and select a configuration for one or more multicore processing units based on the evaluation. The configuration that is selected may be selected from among multiple different configurations, each of which represents a different set of options, constraints on scheduling, modules, or other factors that may be incorporated into a configuration. In some embodiments, the multiple different configurations from which the configuration is selected may not each be specifically defined in advance, but rather may be available as options by setting different configuration factors differently. Embodiments are not limited to carrying out any particular process for evaluating software modules and selecting a configuration. Examples of processes that may be carried out by software development tools in accordance with techniques described herein are described below in connection with FIGS. 8 and 9. Further, as discussed below in connection with FIG. 11, in some embodiments a configuration process may be repeated over time and result in an iterative selection of different configurations, as the software development tool may identify over time ways to improve an execution efficiency of the system.

Prior to the start of the process 800, a software developer identifies a problem to be solved, reviews operations that form a part of the solution to the problem and data to be processed as part of the solution, and creates types of software modules based on that review. The types of software modules that are created may be, as discussed above, templates for software modules that will form a part of the solution. Software modules to be executed on processing cores of multicore processing units may be created as instances of these template software modules. In addition, the software developer arranges the template software modules in a template processing chain, such that the software development tool is able to analyze the template software modules in the context of other modules with which the modules are to exchange data. In the example of FIG. 8, the template processing chain identifies the template software modules as well as input/output interconnections between the modules of the template processing chains. The input/output connections may identify the types of data to be processed by each modules, the sources of inputs for modules, and the destinations of outputs of modules.

The process 800 begins in block 802, in which the software development tool receives the template processing chain including the template software modules, and the specification of data to be processed by software modules based on the template software modules. As discussed above in connection with FIG. 7C, a template processing chain may include multiple different software modules that may be included in each of the processing chains of a solution to a problem. The processing chains may, in some cases, identify the operations to be performed on data related to the problem. In the case of financial arbitrage, for example, the template processing chain may identify the operations to be performed for processing sequences of potential trades and the arrangement of the operations into software modules. The specification of data may include any suitable information describing the data to be processed by the modules or the manner in which the data is to be processed. For example, the specification may include information defining types of and/or sources of data to be processed. The specification may also include information defining or constraining a manner in which the data can be processed together in processing chains. In the case of financial arbitrage, for example, the specification may identify data to be included in trading information, such as prices of potential trades and identifications of counterparties to potential trades. The specification of data for financial arbitrage may further include constraints on the way in which potential trades can be combined to create chains of potential trades. For example, a constraint may be imposed that a sequence of trades cannot include more than one trade with the same counterparty. Though, it should be appreciated that embodiments are not limited to receiving modules arranged in a template processing chain in any particular manner, nor are embodiments limited to receiving a specification of data in any particular manner.

In block 804, the software development tool evaluates the template software modules, including the instructions included in the template software modules and data to be processed by the template software modules. The template software modules may be evaluated to determine characteristics of the instructions included in each template software module and that will be included in each software module that is an instance of the template. The specification of the data and/or examples of the data itself may be evaluated by the software development tool to identify characteristics of the data, such as a frequency of variability of the data or a manner in which the data varies.

The software development tool also, in block 806, uses the template processing chain and the specification of data to generate multiple processing chains. Each of the processing chains generated in block 806 includes software modules corresponding to the template software modules of the template processing chain. The software development tool generates the multiple different processing chains by reviewing the specification of data received in block 802 that identifies data to be processed by the modules of the template processing chain. When the software development tool observes, in data recited in the specification of data received in block 802, pieces of data that correspond to inputs of template software modules for the template processing chains that can be combined in a way that satisfies the constraints for combining data, the software development tool replicates the template processing chain for the pieces of data. By replicating the template processing chain, the software development tool creates instances of the software modules of the template chain and configures the instances with sources of inputs and destinations of outputs that correspond to the pieces of data.

The software development tool may identify the pieces of data that may be combined in any suitable manner, as embodiments are not limited in this respect. Sets of data may be predefined in some embodiments, and specified in the specification of data received in block 802. In other embodiments, the software development tool may evaluate the specification of data and identify permutations of the data that satisfy the constraints for combining data.

By performing the generation of block 806 for each set of data defined by the specification of data, the software development tool can use the template processing chain to create a full graph of interconnected software modules for execution on one or more multicore processing units that processes the data identified by the specification received in block 802.

The software development tool may then, in block 808, evaluate the graph of software modules and the interconnections between the modules to determine characteristics of instances of the software modules and the manner in which the software modules interrelate and execute.

Based on the evaluations of blocks 804 and 808, the software development tool selects a configuration for the multicore processing units and processing cores of the multicore processing units from among multiple potential configurations. In block 812, the software development tool produces configuration inputs for the selected configuration. Once the configuration information is produced in block 812, the process 800 ends. Following the process 800, the configuration information produced by the software development tool may be used to configure one or more multicore processing units. Software modules may then be executed quickly and efficiently on processing cores of the multicore processing units based on the configuration.

Figure 8:
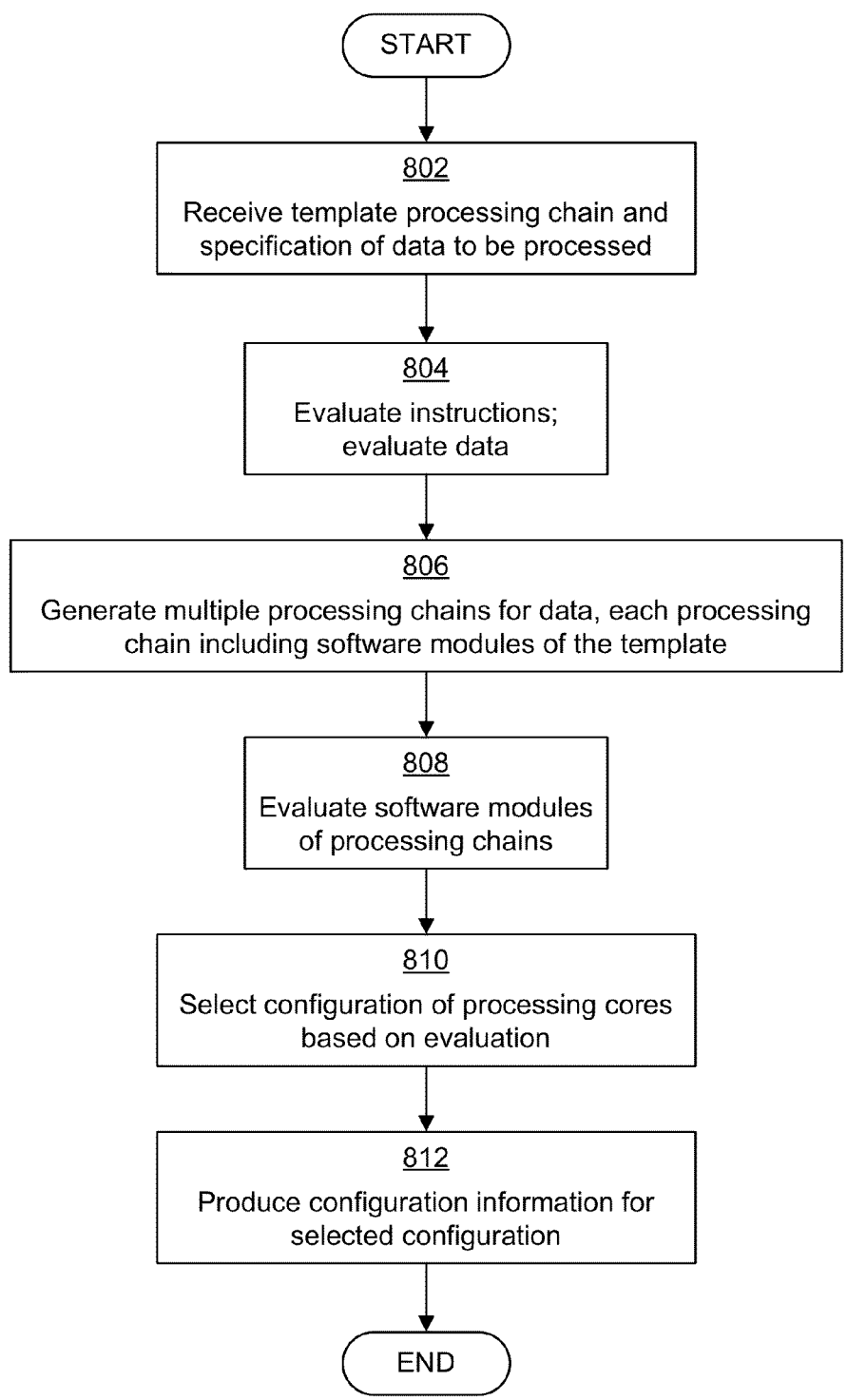
FIG. 8 is a flowchart of an exemplary process for selecting a configuration for efficiently executing software modules on multicore processing units that may be performed in some embodiments.

In connection with FIG. 8, examples of types of evaluation that are conducted by a software development tool reviewing software modules were not discussed in detail. Examples of the types of evaluations that may be carried out by a software development tool operating in accordance with techniques described herein are described in detail in connection with FIG. 9.

Figure 9:
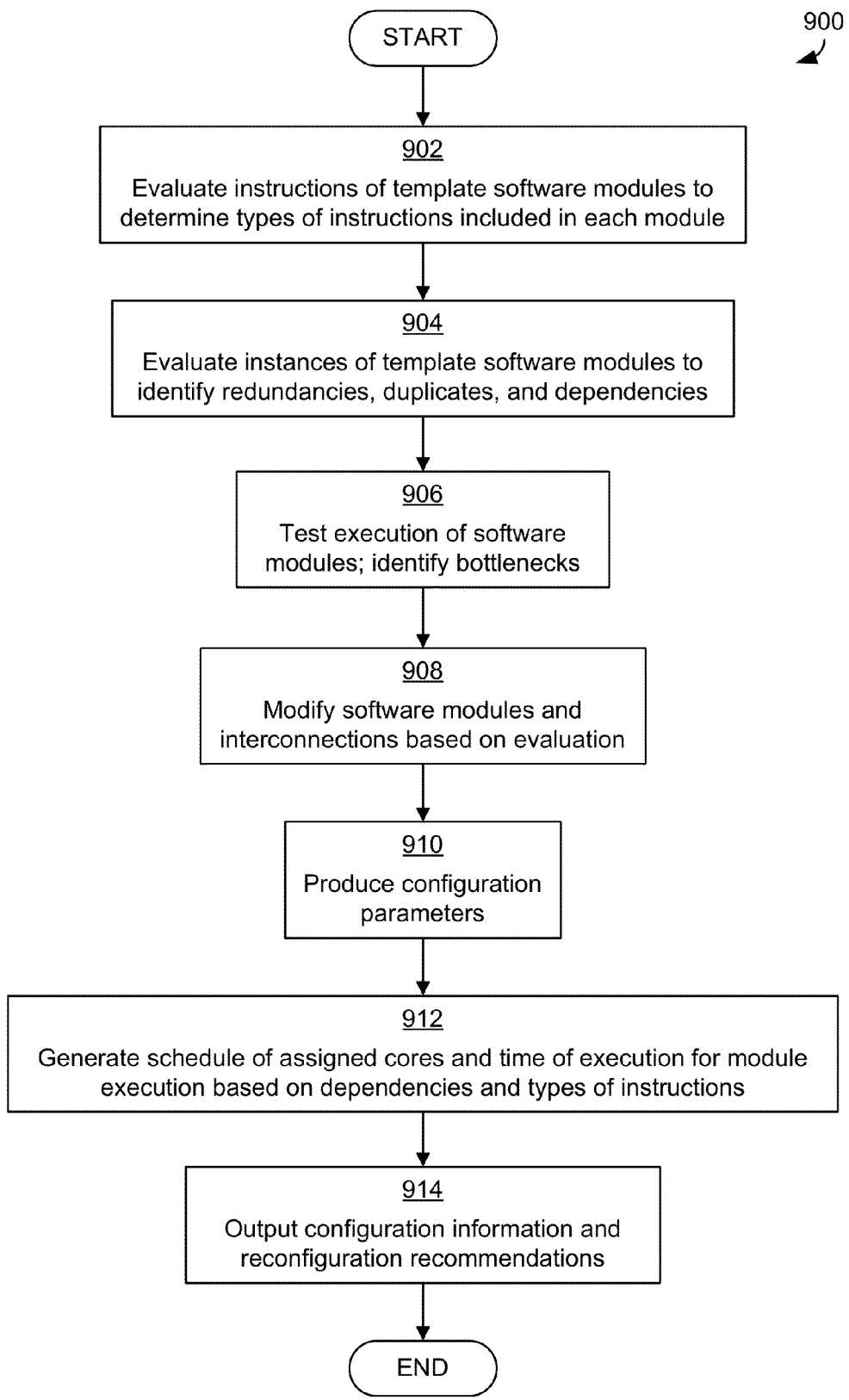
FIG. 9 is a flowchart of an exemplary process for evaluating software modules to determine a configuration for efficiently executing the software modules that may be performed in some embodiments.

Similar to FIG. 8, prior to the start of the process 900 of FIG. 9, a software developer identifies a problem to be solved, reviews operations that form a part of the solution to the problem and data to be processed as part of the solution, and creates types of software modules based on that review. The types of software modules that are created may be, as discussed above, templates for software modules that will form a part of the solution. The software module types may include any suitable instructions formatted in any suitable manner. The instructions may include instructions that are executable by processing cores or instructions arranged according to an intermediate language that is not executable by processing cores of the multicore processing unit(s) on which the modules are to be executed. In addition, the software developer arranges the template software modules in a template processing chain, such that the software development tool is able to analyze the template software modules in the context of other modules with which they communicate. In the example of FIG. 9, the template processing chain identifies the template software modules as well as data to be processed by the modules and interconnections between the modules, such as input/output interconnections.

The process 900 begins in block 902, in which the software development tool evaluates instructions of template software modules provided to the software development tool. The software development tool may evaluate the instructions of the template software modules to identify types of instructions included in each of the template modules and that will therefore be included in each of the instances of that template created to process specific data.

The instructions included in each of the template software modules may be evaluated in block 902 to determine whether any of the template software modules includes instructions of a type that one or more of the processing cores is specially adapted to execute. For example, if the software development tool determines that a template software module includes logical instructions, the software development tool may determine that instances of that template software module should, where possible, be assigned to a processing core that executes logical operations quickly and efficiently. Such logical operations may be assigned, for example, to a processing core of a central processing unit or to a processing core of a graphics processing unit that is specially adapted for executing logical instructions. Similarly, if the software module determines that a template software module includes memory access operations to exchange data with other processing cores, the software development tool may determine that instances of that template software module should, where possible, be assigned to a processing core that executes such operations quickly and efficiently. In some embodiments, rather than merely evaluating whether a module includes these instructions, a number of such instructions may be determined for each module. Modules with larger numbers of these instructions, such as a number larger than other modules or a number above a threshold, may be assigned to processing cores specially adapted to perform such processing.

In embodiments in which the module types include instructions in an intermediate language, the instructions included in each of the template software modules may additionally or alternatively be evaluated in block 902 to determine how the intermediate language instructions will be interpreted by an interpretation facility. An interpretation facility may interpret different intermediate language instructions as corresponding to different instructions of an instruction set that may be executed by a processing core. In some cases, an operation to be carried out may be representable in intermediate language in multiple different ways, as multiple different sets of instructions. The interpretation facility may interpret the different sets of intermediate language instructions differently and may produce different instructions, some of which may execute on processing cores more quickly than others. Further, the interpretation facility may interpret a set of intermediate language instructions differently based on the data that is to be processed, such that a different set of instructions may be produced by the interpretation facility based on characteristics of the data or the way in which the instructions will operate on the data. For example, in cases in which the same type of operation is to be performed on multiple pieces of data, the interpretation facility may by default produce Single Instruction, Multiple Data (SIMD) instructions for processing the data. The interpretation facility may produce the SIMD instructions even if the intermediate language instructions are not written in a SIMD format, because of the interpretation facility's default rule that SIMD instructions should be used where possible. In embodiments in which the software module types of a template processing chain are formatted using an intermediate language, the software development tool may therefore evaluate intermediate language instructions to determine how an interpretation facility will interpret the instructions.

In block 904, once the software development tool has created software modules based on the templates and on the data to be processed by the software modules, the software development tool may evaluate the instructions of the instances. To evaluate instructions of the instances, the software development tool may evaluate the instructions to identify duplicate modules, superfluous instructions, and dependencies between the software modules.

The software development tool may detect modules that execute the same instructions on the same inputs to produce the same outputs to be duplicate modules. Duplicates may occur for a variety of reasons, including overlap in the data sets to be processed by software modules. In the example of FIG. 7C, for instance, because the two sequences of potential trades shown in the figure both include a trade of currency "$Curr_2$" for currency "$Curr_3$" with entity "$Bank_2$," when instances of template software modules are created for those processing chains, the resulting graph may include two modules that each determine the rate "$Rate_2$" for the same trade. If such a duplicate module were left in the graph, then the multicore processing unit(s) may duplicate the execution of these instructions. This duplication may be unnecessary and undesirable. When a processing core executes the duplicate software module, that processing core is not executing another software module that may also need to execute. The duplication may therefore result in a slowdown of the execution of the software modules that may be undesirable. A similar evaluation may be made to identify redundant software modules that have similarities to other software modules, such as including the same or similar operations, operating on the same or similar inputs, or producing the same or similar outputs. A redundant software module may not be a duplicate of another software module because of a difference with the other software module, but may be redundant because the similarity between the software modules may mean that the two software modules could be merged into one software module. A redundant software module may be undesirable for similar reasons as a duplicate software module. However, as discussed below, in some cases a duplicate or redundant software module may be desirable and may increase execution speed or efficiency. For example, in some cases discussed below, a duplicate or redundant software module may free resources or reduce the time another software module may be waiting for input.

Superfluous instructions may be sets of instructions that are unnecessary to execute. An example of a set of superfluous instructions is an instruction to add 1 to a variable, followed at a later time by an instruction to subtract 1 from the variable, when the variable was not used between the two instructions. Because the variable was not used, the addition and subtraction instructions do not impact execution of the software modules or any other process in a substantive way, and thus the instructions may be superfluous. Another example of superfluous instructions includes calculating and storing a value that is not used by the software modules, or any other process executing on the processing unit(s). Instructions that do not substantively affect the operations of the software modules or other processes may be superfluous. Superfluous instructions may be removed to increase execution speed and efficiency.

Dependencies between the software modules may be analyzed by the software development tool for the purpose of identifying constraints on scheduling execution of software modules. If one software module receives as input a value output by another software module, then the software module may be dependent on the other software module from which it receives an output value. Because the software module is dependent, the software module should be scheduled for execution after execution of the other software module. By scheduling the software module for later execution, the value calculated and output by the other software module may be available when the software module is to be executed. Dependencies of software modules may be determined in any suitable manner, including by reviewing destinations of outputs and sources of inputs from software modules through reviewing stored information about the software modules or monitoring execution of the software modules.

In block 906, the software development tool may test execution of the software modules, such as using sample input data, to monitor execution characteristics of the software modules and monitor characteristics of the data. To monitor execution characteristics, the software development tool may request that the modules be executed on one or more multicore processing units. In embodiments in which the software modules of the template processing chain are arranged in an intermediate language, the software development tool may, in block 906, request that an interpretation facility interpret the software modules and produce instructions that are executable on processing cores of the multicore processing unit(s). In some embodiments, a management facility for a multicore processing unit may be able to monitor performance of a multicore processing facility and produce data describing the performance. The performance data may include any suitable information. The performance data indicate, for example, how one or more instructions of a software module were executed, how many times requested data was not available in a cache and was requested from other storage, how much time a software module spent waiting for an input to be available, or any other information describing how the software modules were executed by the multicore processing unit(s). Following execution of the software modules on the multicore processing unit(s), the software development tool may communicate with the management facility for the multicore processing unit to retrieve the performance data. From an evaluation of the performance data, the software development tool may be able to determine which of the software modules are executing slowly and causing bottlenecks in the execution of the software modules. When the software development tool detects from the performance data a bottleneck in execution of the software modules, the software development tool may respond in any suitable manner, including by diagnosing a source of the bottleneck and/or by attempting to eliminate the bottleneck. To diagnose a source of the bottleneck, the software development tool may examine a time at which the bottleneck occurs and one or more software modules executing on one or more cores at that time, or any other information regarding a context of the bottleneck. The software development tool may determine, from this information, the instructions that were executing at the time of the bottleneck. The software development tool may evaluate the instructions that are executing slowly and causing the bottleneck, and/or may further review the types of the instructions or parameters of the instructions to determine a possible cause of the bottleneck. For example, the software development tool may determine that a delay is related to a memory access operation that is requesting a large amount of data that is not present in a local cache of the multicore processing unit, and the delay is caused by waiting for retrieval of the data from disk. To monitor characteristics of the data in block 906, the software development tool may monitor the extent to which the data changes over time, such as a number of bits in the data that change at a given time when new data is received and is to be provided to software modules for processing.

As part of executing the software modules in block 906, the software development tool may evaluate a number of modules that are to be executed in parallel at one time. The number of modules to be executed together at one time may affect the execution efficiency of software modules. As more software modules are executed at one time, if the number of software modules to be executed is greater than the number of available cores, more context switches for more processing cores have to be carried out to swap modules on the processing cores. This can increase execution times. Additionally, as more modules are executed in parallel, the modules may compete for resources and lengthen the execution times for each module. However, it may also be the case that, as more software modules are executed at one time, the number of operations executed in parallel increases, which can decrease execution times. Accordingly, to determine the most efficient number of modules to execute at any time, the software development tool executes the software modules on processing cores of one or more multicore processing units. Following execution of the software modules, the software development tool retrieves performance data for the multicore processing units from a management facility. Performance data, as mentioned above, may include any suitable data regarding performance of the software modules and/or the processing cores. In some cases, the performance data may include information regarding a speed with which instructions are executed and a speed with which context switches are made.

In response to the evaluations of blocks 902-906, the software development tool may produce configuration information for one or more multicore processing units. The configuration information may include the software modules themselves, settings for hardware and/or software configuration parameters of a multicore processing unit, information regarding how an interpretation process should be performed by an interpretation facility, and/or information identifying constraints on scheduling of execution of the software modules.

Constraints on scheduling of execution of software modules may include any suitable information regarding a manner in which modules should be executed, an absolute timing of execution of software modules, a timing of execution of software modules relative to other software modules, or any other constraint on scheduling. Scheduling constraint information may include, for example, information identifying dependencies between software modules, the number of software modules that may be executed at one time, types of processing cores to which types of software modules should be assigned, or other information identifying how modules should be scheduled for execution.

As part of generating the software modules, the software development tool may, in block 908, modify the software modules. Modifying the software modules may include modifying individual software modules and/or modifying collections of software modules generated by the software development tool based on the template software modules. To modify an individual software module, as discussed below, the software development tool may make changes to the instructions included within a software module or a template software module of the template processing chains. To modify a collection of software modules, the software development tool may add software modules to a collection or remove software modules from the collection. The software development tool may also modify a collection of software modules by editing interconnections between the software modules, including by editing the inputs and outputs of software modules.

The software development tool may modify software modules in any suitable manner to eliminate inefficiencies or otherwise increase the speed and efficiency of execution of software modules.

In some embodiments, for example, a software development tool may modify software modules by modifying instructions included in the software modules. As discussed above, operations that may be performed as part of a system for producing a solution to a complex problem may, in some cases, be able to be performed using various different sets of instructions. Some of the sets of instructions may execute more efficiently than others, or may execute more efficiently than others on a particular type of processing core to which a software module is to be assigned. Accordingly, the software development tool may modify instructions included in a software module such that the software module includes instructions, to carry out an operation, that will execute quickly and efficiently. As also discussed above, in some embodiments the software development tool may evaluate software modules that are formatted according to an intermediate language that is not executable on processing cores of a multicore processing unit on which the modules are to be executed. The intermediate-language instructions of the software modules may instead be interpreted by an interpretation facility to produce instructions that will be executed by a processing core. As discussed above, an interpretation facility may interpret some intermediate language instructions differently than others and an interpretation of some intermediate language instructions may result in instructions that would execute more quickly or efficiently than others. Accordingly, in some embodiments, the software development tool may modify a software module such that the module includes intermediate language instructions for which an interpretation would produce instructions that would execute quickly and efficiently.

As another example, a software module may include instructions to store data, and some of these instructions may identify a location at which the data is to be stored. For example, some instructions may identify that data should be stored in a memory to which a processing core may have preferential access, such as an on-chip cache exclusive to a processing core or an on-chip block cache that is accessible to one or more other processing cores of a block. Based on the manner in which the data is to be used during execution of the software modules, such as the frequency of use of the data by the module or whether the data is used by other modules, efficiencies may be gained by storing this data in particular memory locations. Accordingly, based on evaluating the way in which data is to be used during execution of the software modules, memory access operations of a software module may be edited to change a memory location at which data is to be stored.

As another example, if the software development tool identified a duplicate module in the software modules that is a duplicate of another software module, the software development tool may remove the duplicate module in the graph. The software development tool may then determine whether any software modules depended on the duplicate module and received input from the duplicate module. If so, the software development tool may change the interconnections of the software modules such that the dependent software modules depend on, and receive input from, the other software module for which the duplicate module was a duplicate. In this way, the inefficiency created by the duplicate software module can be eliminated, while the remaining software modules can continue to execute correctly following removal of the duplicate.

In contrast, in some cases, the software development tool may in block 908 refrain from removing a duplicate or may insert duplicate software modules into the software modules. A duplicate may be inserted to remove or mitigate a bottleneck or other inefficiency identified for the software modules. The bottleneck or other inefficiency may be determined from data stored during the execution of the software modules and/or from data stored during a simulation of execution of the software modules. When multiple other software modules are waiting for one software module to finish processing and provide an output to these other software modules, this may create a delay in execution due to the inability of these other software modules to execute without the input. To attempt to decrease the overall impact of the delay, the software development tool may attempt to create duplicate modules that may be able to execute at different times or in parallel. The software development tool may then alter the dependencies of the dependent software modules, such that some of the dependent modules depend from the original module and others depend from a duplicate. This may create the possibility that only one of the duplicate modules may be delaying at any time and only a portion of the dependent modules may be delayed, waiting for the input value. When only a portion of the dependent modules are delayed at a given time, this may increase the execution speed and efficiency of the software modules.

Similarly, in some cases, the software development tool may, in block 908, create new software modules by splitting operations of a software module into multiple different parts.

This may also be done in the case of a bottleneck or other inefficiency identified for the software modules. The bottleneck or other inefficiency may be determined from data stored during the execution of the software modules and/or from data stored during a simulation of execution of the software modules. For example, when a software module is to perform the same set of operations on multiple different inputs, during execution the software development tool may identify that some of the input data may be available more quickly than others of the input data, and that the software module beginning or ending of the execution of the software module is delayed due to the unavailability of the input data. In some such cases, the software development tool may divide the operations of this software module into multiple different modules. Each of the created modules may perform the set of operations of the original module on one or more of the inputs to the original module. By splitting the operations into multiple different modules, the operations that are to be executed on each of the inputs may be executed once those inputs are available, rather than the original module delaying execution until all of the inputs are available. In some cases such as this, a software module may include a set of operations that are to be carried out on multiple inputs, followed by other operations that are to be carried out on the results of those operations. For example, a software module may include operations to multiply each of multiple inputs by a value and other operations to sum the products of those multiplications. When the software development tool modifies a software module such as this, the software development tool may create multiple modules that each perform the multiplication operation on one or more inputs and create another module that includes the other operations to sum the products. When such modules are created, the inputs and outputs of the modules may be configured and dependencies determined such that the new modules are able to be inserted into the graph and processed along with other modules of the graph.

In addition to or as an alternative to being able to divide a software module into multiple different software modules to increase efficiency and/or speed of execution of the software module or an overall set of software modules, in some embodiments, the software development tool may be adapted to merge software modules. Redundant software modules, which have similarities in operations, inputs, and/or outputs, may be merged in some cases in which the software development tool determines that a merge would increase execution efficiency or speed. When merging software modules, the software development tool may create a software module for execution by adding to an existing software module the instructions included in one or more other software modules. The software development tool may also configure the merged software module to include the inputs and outputs of two or more software modules that were merged to create the software module.

The software development tool may also address, in block 908, superfluous instructions that were detected in block 904. For superfluous instructions, where possible, the software development tool may attempt to remove the superfluous instructions from software modules as part of the modifying of block 908. The removal of superfluous instructions may be carried out in any suitable manner, including by editing software modules to remove the instructions from the software modules.

In embodiments in which the software development tool edits individual software modules and/or collections of software modules in the manner described above, the software development tool may do so with or without user approval. In some embodiments, when the software development tool makes a change to a software module, the software development tool may edit the software module without accepting user input regarding the change to be made to the software module. In other embodiments, however, the software development tool may request approval for changes from a user.

In block 910, the software development tool may set configuration parameters of the hardware and/or software of the multicore processing unit based on the evaluation. For example, based upon the evaluation of how the data changes, including a number of bits in the data that change when new data is received, the software development tool may set configuration parameters related to data transfer within a multicore processing unit or between a multicore processing unit and another component. The configuration parameters may relate to how data is transferred between processing cores of a multicore processing unit, between a processing core a cache of a multicore processing unit, and/or between a multicore processing unit and shared system memory of a computing device that includes one or more multicore processing units. The configuration parameters may be set such that exchange of data is performed efficiently. The software development tool may set the configuration based, for example, on a determination of how data changes, as determined by the evaluation of the data by the software development tool. For example, when the number of bits expected to change at one time is small, the software development tool may configure the multicore processing unit to transfer only changed bits. Transferring only the changed bits may reduce the time used for transferring data. Though, to transfer only the changed bits, a determination is made of which bits have changed. Making this determination may increase the time necessary to transfer data. Transferring the changed bits may therefore only increase efficiency when a total time for the determination and transfer may be lower. Thus, when the number of bits expected to change at one time is large, the software development tool may configure the multicore processing unit to transfer all bits of changed data. By transferring all bits, no determination of which bits have changed need be made.

Configuration parameters produced by the software development tool may also include configuration parameters specific to a particular software module. For example, in some cases an input for a software module may be a stream of data, and the software module may execute repeatedly to process data each time the data for the input changes. In some cases, configuration information relating to such a software module may configure a scheduling facility for a multicore processing unit to permit the software module execute only once for each change in value of the input. When the scheduling facility is configured in this way, the scheduling facility may wait to execute the software module until a change in the input is detected. In other cases, though, configuration information relating to such a software module may configure the scheduling facility to permit the software module to execute regardless of whether a value of the input has changed since the last time the software module was executed. The scheduling facility, when configured in this way, may therefore permit the software module to execute when a processing core is available to execute the software module and when other conditions for the software module's execution (such as availability of other inputs to the module) are met.

As mentioned above, in some embodiments an interpretation facility for a multicore processing unit may interpret the software modules evaluated by the software development tool and produce, for the software modules, instructions that can be executed by processing cores of a multicore processing unit. In some such embodiments, the interpretation facility may accept configuration input that governs a manner in which the interpretation is performed. For example, the interpretation facility may be configured to carry out the interpretation according to default rules for interpretation. Some of the default rules may identify instructions that will be output by the interpreter when certain conditions are met. For example, an interpretation facility may be configured to output Single Instruction, Multiple Data (SIMD) instructions when the interpretation facility detects that a software module or multiple software modules include an operation that is repeatedly performed on input data. The interpretation facility may be configured with such a default rule because using SIMD instructions may, in some cases, increase speed or efficiency of processing. The interpretation facility may be configurable not to use SIMD instructions by default or not to prefer SIMD instructions over other types of instructions when performing the interpretation. The software development tool may, based on an evaluation of software modules or data to be processed by the software modules, recognize in some cases that SIMD instructions may not result in greater execution speed or efficiency for a software module or a group of software modules. The software development tool may therefore, in these cases, output configuration parameters governing how the interpretation facility performs the interpretation such that the interpretation facility would not use SIMD instructions in some cases. An interpretation facility may accept other input to configure a manner in which the interpretation is performed and the software development tool may produce output corresponding to these inputs the interpretation facility is configured to accept. The software development tool is not limited to producing any particular configuration parameters for use by an interpretation facility.

In block 912, the software development tool generates information identifying constraints on a schedule of assigned cores and relative time of execution for software modules, which may be based on the determined dependencies of the software modules and the determined characteristics of the instructions of each software module. The information generated in block 912 may also be based on a number of software modules to execute at any one time, which may be determined during the testing of block 906. The scheduling constraint information that is generated may be in a format that is used by a scheduling facility of one or more multicore processing units, so that the scheduling facility may directly use the constraint information generated by the software development tool to determine a schedule for execution of software modules. By generating scheduling constraint information based on core assignments and dependencies, the software development tool may enable software modules to be scheduled for execution on processing cores that would execute the instructions of the software modules quickly and efficiently. Such processing cores may be specially adapted to execute the instructions, as discussed above. Additionally, the software development tool may monitor dependencies of software modules and enable software modules to be loaded onto a processing core for execution only after the execution of other software modules from which the modules depend, such that software modules are not waiting for inputs and delaying execution.

In block 914, once the configuration information is generated by the software development tool in blocks 908-914, the configuration information is output by the software development tool. The configuration information may be output in any suitable manner. In some embodiments, the configuration information may be output to a user. In other embodiments, the configuration information may be output to a storage from which the information may be provided to a management facility, or may be output directly to a scheduling facility of the management facility. The management facility and scheduling facility may be located on the same computing device as the software development tool or a different computing device.

In addition, in some embodiments, in block 914, the software development tool may output reconfiguration recommendations to a user of the software development tool. The reconfiguration recommendations may be output in any suitable manner, as embodiments are not limited in this respect. The reconfiguration recommendations may also include any suitable recommendations, including recommendations to change the software modules in ways to improve speed and/or efficiency of execution. The recommendations may include recommendations for making changes to the software modules that the software development tool was not capable of making in block 908. For example, if the software development tool is not able to remove a superfluous instruction from a software module, the software development tool may notify the user of the existence of the superfluous instruction. The recommendations may also relate to how to improve performance of the software modules by making changes to the target hardware on which the modules are to be executed. For example, the software development tool may determine in block 906 that a bottleneck in execution is being caused by particular instructions included in the software modules that are not executing efficiently on one or more hardware components of the multicore processing units. The software development tool may be configured with information regarding different types of hardware that are able to execute instructions in different ways. The software development tool may use this information to identify, in some cases, hardware components that may execute instructions more quickly or efficiently. For example, the software development tool may determine, using performance data collected by a management facility regarding execution of software modules on a multicore processing unit, that some instructions are being executed slowly. The software development tool may identify from the performance data that the instructions that are executed slowly are instructions that interact with an Arithmetic Logic Unit (ALU) of the multicore processing unit. The software development tool may also determine that the ALU is causing a bottleneck because that ALU is not arranged to execute those specific instructions quickly. The software development tool may recommend, based on the information regarding the hardware, a different ALU of a different multicore processing unit that may execute the instructions more quickly.

Once the configuration information and the reconfiguration recommendations are output in block 914, the process 900 ends. Following the process 900, in some cases, one or more multicore processing units may be configured with the configuration information, or a software developer may determine that changes should be made based to the software modules on the information provided by the software development tool, and may make the changes to the software modules rather than configure a processing unit with the software modules.

Figure 10:
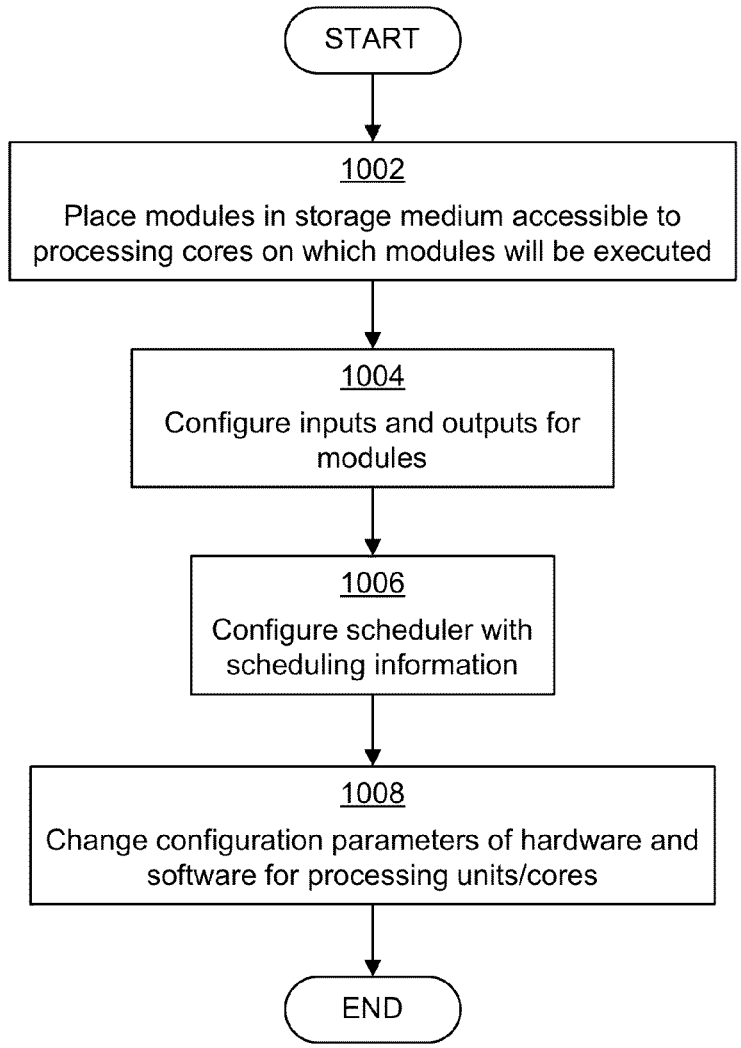
FIG. 10 is a flowchart of an exemplary process for configuring one or more processing units to execute software modules.

Configuration of a multicore processing unit according to configuration information produced by a software development tool may be carried out in any suitable manner, as embodiments are not limited in this respect. FIG. 10 illustrates one example of a process 1000 that may be performed in some embodiments for configuration a multicore processing unit.

Prior to the start of the process 1000 of FIG. 10, a software development tool evaluates software modules that have been created by a software developer and/or by the software development tool and data that has been specified by a software developer, and produces configuration information. In some embodiments, the software modules created by the developer/tool may have been formatted according to an intermediate language, and may be interpreted by an interpretation facility of a multicore processing unit. Configuration information created by the software development tool may then be used in the process 1000 of FIG. 10 to configure the multicore processing unit to execute the software modules evaluated by the software development tool.

The process 1000 begins in block 1002, in which a configuration facility for the multicore processing unit places the software modules of the configuration information, which were generated by the software development tool and may have been, in some embodiments, interpreted by an interpretation facility, in a storage medium accessible to the processing cores on which the modules will be executed. In block 1004, the configuration facility configures the sources of inputs of the modules and the destinations of outputs of the modules. By configuring the inputs and outputs in block 1004, the software modules may be able to retrieve inputs from particular memory locations and store outputs at particular memory locations. Additionally, the multicore processing unit may be configured with information about the inputs and outputs for each software module, such that the multicore processing unit, including a scheduling facility, is able to determine when inputs are available for a software module. The multicore processing unit may also be configured with information regarding the inputs and outputs and whether, when an input changes over time a software module should only process inputs upon new data being available for the inputs. In some cases, the multicore processing unit may be configured to execute a software module that has a changing input when the software module is able to execute (e.g., other inputs are available or a core is available), even when new data is not available for the changing input. By configuring the scheduling facility with information about the sources of inputs for a software module, the scheduling facility is able to monitor memory locations that are to store the inputs for a software module and can detect when changes have been made to the memory locations. Such a change to a memory location may indicate that one of the inputs for a software module is available for the software module. The scheduling facility may use such information to determine whether all of the inputs for a software module are available and, if not, prevent a processing core from being configured to execute that software module until all of the inputs are available. Though, as mentioned above, in some embodiments the scheduling facility may be configured, for a software module, to execute a software module when an input is available for the software module but the input does not reflect new data.

In block 1006, the configuration facility provides scheduling constraint information, produced by the software development tool to a scheduling facility for the multicore processing unit. The scheduling facility may then use the scheduling constraint information to direct assignment of software modules to processing cores. The scheduling constraint information, as discussed above, may indicate that particular software modules should be assigned to particular types of processing cores and/or that particular software modules should be assigned to cores for execution after other software modules have executed. The scheduling constraint information may also indicate, in some cases, a number of software modules to execute in parallel at any one time, such as a maximum number.

In block 1008, when the configuration information includes configuration parameters to be changed, such as read/write parameters for the multicore processing unit, the configuration facility changes configuration parameters of the hardware and/or software of the multicore processing unit. The change may be carried out in any suitable manner, including by the configuration facility communicating with a software facility of the multicore processing unit or the configuration facility storing data in a register of the multicore processing unit.

Once the configuration facility changes the configuration parameters in block 1008, the process 1000 ends. Following the process 1000, the multicore processing unit is configured to execute software modules for solving a complex problem quickly and efficiently on low-cost hardware, such as the multicore processing unit that was configured.

It should be appreciated that configuration of software modules, management facilities, and/or multicore processing units for execution of the software modules may be carried out more than once. In some embodiments, rather than evaluating modules, configuring a multicore processing unit, and then executing the modules based on that configuration without reconfiguring the modules, an evaluation and configuration may be carried out multiple times. For example, in some embodiments, a software development tool may obtain and review performance data regarding execution of software modules on one or more multicore processing units and produce new configuration information based on the performance data, and the software modules may execute on the multicore processing unit(s) according to the new configuration. The software development tool may then repeat the reviewing of performance data and production of new configuration information over time. The performance data that is collected regarding execution of software modules may include performance data regarding the execution of the modules in a development environment and/or in a production environment. Accordingly, a software development tool may repeatedly change a configuration of a multicore processing unit to attempt to improve efficiency and/or speed of execution of the software modules.

Figure 11:
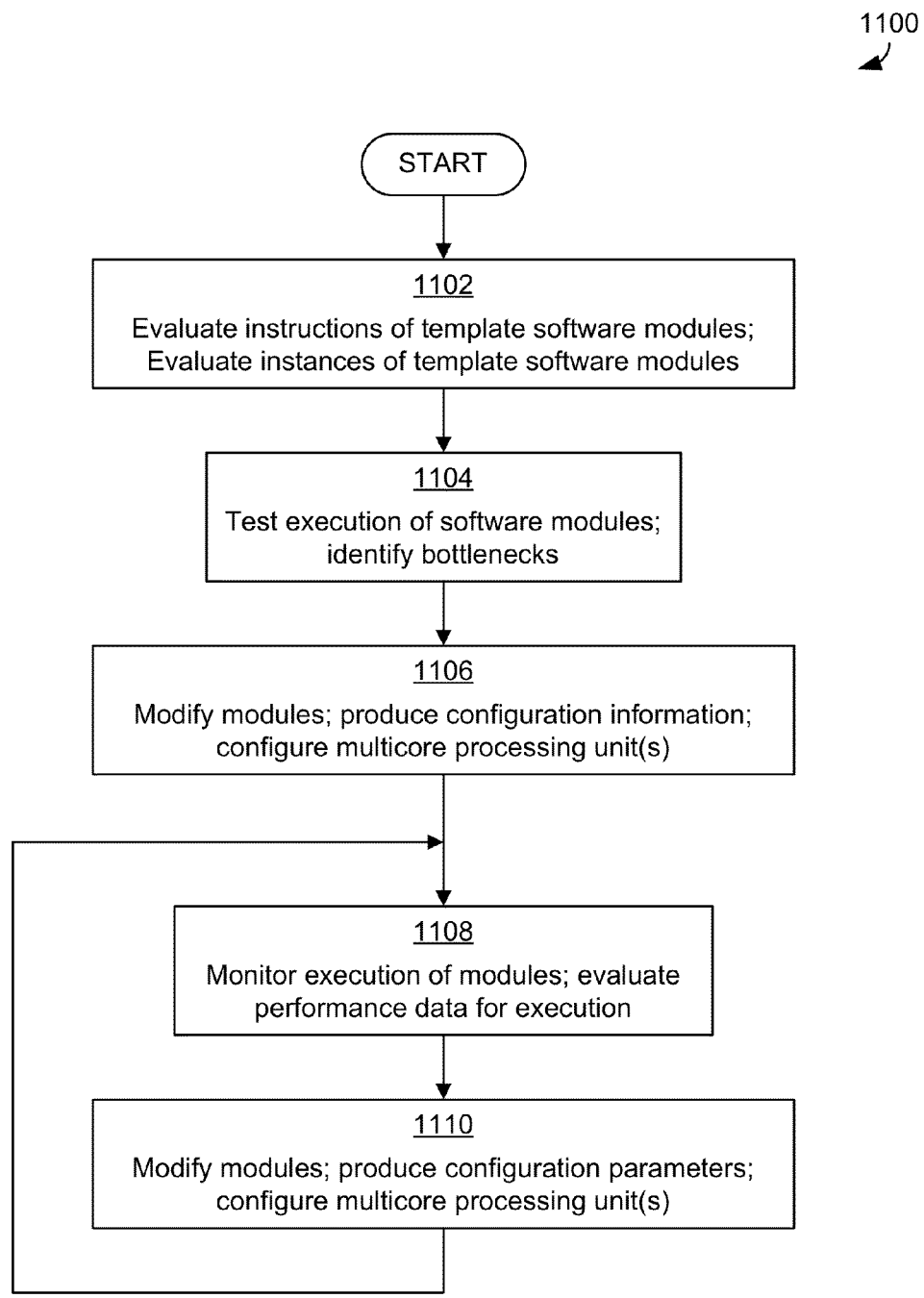
FIG. 11 is a flowchart of an exemplary process for iteratively configuring one or more processing units to execute software modules.

FIG. 11 illustrates one process that may be carried out by a software development tool in some embodiments. The process 1100 of FIG. 11 may be similar in some ways to the processes of FIGS. 6, 8, and 9 discussed above, in that a software development tool performs an evaluation, produces configuration information, and configures one or more multicore processing units.

Prior to the start of the process 1100 of FIG. 11, a software developer identifies a problem to be solved, reviews operations that form a part of the solution to the problem and data to be processed as part of the solution, and creates types of software modules based on that review. The types of software modules that are created may be, as discussed above, templates for software modules that will form a part of the solution. The software module types may include any suitable instructions formatted in any suitable manner. The instructions may include instructions that are executable by processing cores or instructions arranged according to an intermediate language that is not executable by processing cores of the multicore processing unit(s) on which the modules are to be executed. In addition, the software developer may arrange the template software modules in a template processing chain, such that the software development tool is able to analyze the template software modules in the context of other modules with which they communicate. In the example of FIG. 11, the template processing chain identifies the template software modules as well as data to be processed by the modules and interconnections between the modules, such as input/output interconnections.

The process 1100 begins in block 1102, in which the software development tool evaluates instructions of one or more template software modules of a template processing chain and/or evaluates instructions of instances of the one or more template software modules. The evaluation of block 1102 may be carried out in any suitable manner, including according to techniques described above in connection with blocks 902-904 of FIG. 9.

In block 1104, the software modules of processing chains are executed on processing cores of one or more multicore processing units. The software development tool may, in block 1104, obtain performance data relating to this execution and review the performance data to identify bottlenecks or other inefficiencies. The execution of review of block 1104 may be carried out in any suitable manner, including according to techniques described above in connection with block 906 of FIG. 9.

In block 1106, the software development tool, based on the evaluations of blocks 1102, 1104, modifies software modules, produces configuration information, and configures one or more multicore processing units based on the configuration information. The actions taken by the software development tool in block 1106 may be performed in any suitable manner, including according to techniques described above in connection with blocks 908-914 of FIG. 9.

Once the multicore processing unit(s) are configured in block 1106, software modules may be executed on the multicore processing unit(s). The multicore processing unit(s) may be a unit of a development environment and/or of a production environment, as embodiments are not limited in this respect. If the multicore processing unit(s) form a part of a production environment, the software modules may be processing data relating to a real-world implementation of a problem, such as by processing trading information for actual potential trades and selecting sequences of trades that are executed. In block 1108, the software development tool may monitor the execution of the software modules and evaluate performance data relating to the execution. As discussed above in connection with block 906 of FIG. 9, the software development tool may obtain performance data related to execution of software modules from one or more management facilities corresponding to the one or more multicore processing unit(s). The software development tool may evaluate the performance data and, as discussed above, produce configuration information based on the evaluation of the performance data. For example, if the software development tool determines from the performance data that one or more instructions are executing slowly, the software development tool may take steps to improve the execution speed or efficiency. Accordingly, in block 1110, the software development tool may again modify software modules, produce configuration information, and configure one or more multicore processing units based on the configuration information. The actions taken by the software development tool in block 1110 may be performed in any suitable manner, including according to techniques described above in connection with blocks 908-914 of FIG. 9.

Once the software development tool modifies the modules, produces the configuration information, and configures the multicore processing unit(s), the process 1100 returns to block 1108, in which the modules are executed and the software development tool monitors execution. Accordingly, the software development module may continue to monitor execution of the modules and change a configuration of a multicore processing unit over time, even as the modules are executed in a production environment.

During the continued monitoring and reconfiguration of the process 1100 of FIG. 11, the software development tool may make changes and determine whether the changes resulted in an improvement to execution speed or efficiency. In some cases, a change made by the software development tool may not result in an improvement to execution speed or efficiency. For example, in some cases, a change made by the software development tool may mistakenly result in a drop in execution speed or efficiency. The software development tool may therefore store performance data for previous configurations produced by the software development tool and, in block 1108, compare performance data for a current configuration to performance data for one or more previous configurations. The software development tool may also store information regarding changes previously made to configurations. If the software development tool determines in block 1108 from the comparison that a new configuration has resulted in a drop in execution speed or efficiency, the software development tool may in block 1110 undo the changes made to the configuration.

The software development tool is not limited to selecting configuration changes to be made during the loop of FIG. 11 in any particular manner. In some embodiments, the software development tool may make changes to a configuration based on the performance data and a determination that a change to configuration may result in an improvement in performance. In some embodiments, however, the software development tool may be arranged to iteratively attempt different available configurations to determine when a configuration results in an improvement in execution speed and/or efficiency for the software modules. For example, in some embodiments, the software development tool may iterate through multiple different permutations of one or more possible configuration settings for a management facility and/or multicore processing unit. In some embodiments in which the software development tool iterates through multiple permutations, the software development tool may iterate through all permutations of possible configuration settings for a management facility and/or multicore processing unit. The software development tool may then determine, based on performance data collected during execution of the different permutations, which configuration provides the highest execution speed and/or efficiency for software modules. However, it should be appreciated that embodiments are not limited to implementing a software development tool that selects configuration changes in any particular manner.

Figure 12:
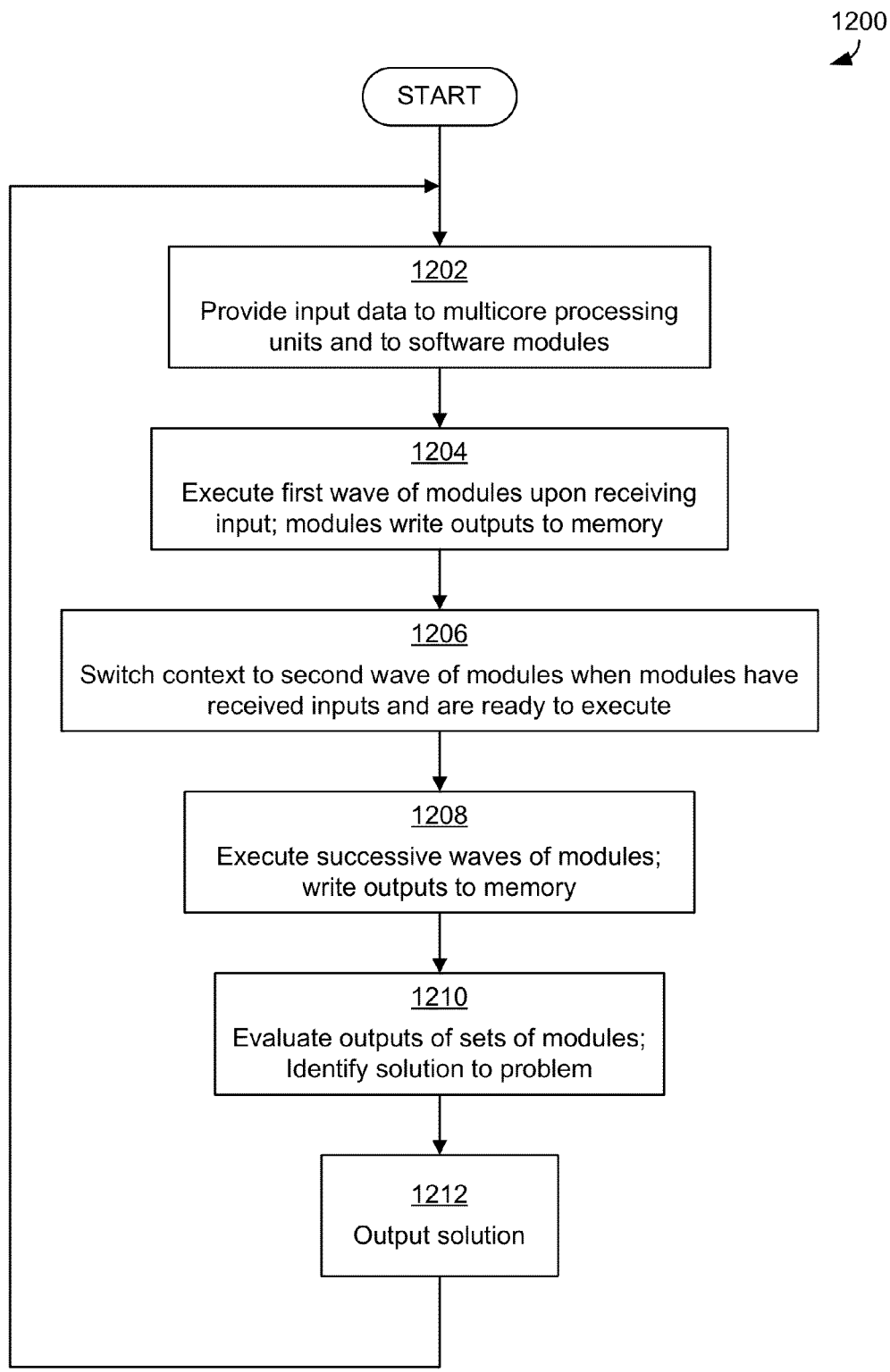
FIG. 12 is a flowchart of an exemplary process for operating one or more processing units to execute software modules of a plurality of processing chains to implement a process for solving a complex problem.

As discussed above, configuration information, including scheduling constraint information, may be in any suitable format and include any suitable information. Embodiments are not limited to operating with any particular type or format of scheduling constraint information, or to operating with multicore processing units that use any particular type of scheduling constraint information. FIG. 12 illustrates one example of a manner in which software modules may be scheduled for execution on processing cores of one or more multicore processing units.

In the example of FIG. 12, scheduling constraint information identifies a time at which software modules are to be assigned for execution to processing cores in terms of a wave to which the software module is assigned. A "wave" may include a group of software modules that are to be executed in parallel at the same time on processing cores of one or more multicore processing units. A wave may include any suitable number of software modules, including the same number of software modules as there are processing cores to which software modules may be assigned. Additionally, a wave may include any suitable types of software modules. In some embodiments, when software modules are assigned to waves, the software modules may be assigned based on type. For example, the modules may be assigned such that all modules of a first type are assigned to execute first, then once all modules of that type have been executed, all modules of a second type may be executed. Executing all modules of a certain type may, in some embodiments, include executing the modules in multiple different waves, such as when the number of modules of a certain type is larger than the number of processing cores. In other cases, however, modules may be assigned to waves to account for dependencies between modules—to prevent a dependent module from being executed before a module on which it depends—and modules of different types may be executed in the same wave.

A software development tool operating in accordance with techniques described herein, or any other suitable human or software entity may assign software modules to waves based on any suitable factors. For example, software modules may be assigned to waves such that when a first software module is dependent on a second software module, the first software module is assigned to a later wave than the second software module. By assigning the first software module to a later wave than the second software module, when the wave to which the second software module is assigned finishes executing, the input on which the first software module depends may be available before the wave to which the first software module is assigned begins executing.

The process 1200 of FIG. 12 illustrates one technique for operating a scheduling facility of a multicore processing unit to schedule software modules for execution on processing cores based on waves to which the software modules have been assigned. Prior to the start of the process 1200, software modules are created by a software developer and/or a software development tool operating according to techniques described herein. The software development tool produces configuration information for the software modules, which includes scheduling constraint information that assigned the software modules to waves. The scheduling constraint information is provided to a scheduling facility and the software modules are stored in a location from which the software modules may be transferred to the processing cores to which the software modules are to be assigned.

The process 1200 begins in block 1202, in which input data to be processed by a set of software modules for parallel execution on processing cores is provided to one or more multicore processing units and to the software modules to be executed on the processing cores. The scheduling facility, in response to detecting that input data is available for the first set of software modules to be executed, triggers execution of a first wave of software modules. The software modules then execute on the processing cores to which they have been assigned and, as a result of execution, write outputs to memory. In block 1206, the scheduling facility triggers execution of a second wave of modules. The scheduling facility may trigger execution of second wave modules upon determining that the software modules of the first wave have finished executing, and that all of the inputs on which software modules of the second wave depend are available for processing by the software modules of the second wave. As part of triggering execution of the second wave modules, the scheduling facility causes a context switch for each of the processing cores on which the first wave of software modules were executed and the second wave of software modules are to execute. As part of the context switch of block 1206, instructions for the first wave of software modules are removed from the processing cores and instructions for the second wave of software modules are made available to the processing cores, including by being stored in a storage accessible to the cores (e.g., an on-chip cache). In addition, data processed by the first wave of software modules is removed from the processing cores, and data to be processed by the second wave of software modules is made accessible to the processing cores.

The scheduling facility may continue, in block 1208, triggering execution of successive waves of software modules and switching contexts of processing cores to different software modules until each of the software modules to be executed on the processing cores has been executed. In block 1210, once the last wave of software modules has been assigned for execution on the processing core, one of the modules or another software facility executing on the processing units may evaluate outputs of the software modules that have been executed and identify a solution to the problem for which the software modules were executing on the processing cores of the multicore processing units. In block 1212, once the solution to the problem has been determined, the solution is output from the multicore processing units to any suitable destination.

In some cases, following output of a solution to the problem to which the software modules relate, execution of the software modules may end. This may be the case, for example, where the software modules are intended to be executed once to determine a single solution to a problem. In other cases, however, such as in the example of FIG. 12, the software modules may relate to a problem that is designed to be run successively on different pieces of input data received over time, such as based on a stream of data received over time. Accordingly, as illustrated in FIG. 12, following output of the solution in block 1212, the process 1200 returns to block 1202 to receive new input data.

It should be appreciated from the foregoing, techniques described herein may be used with any suitable software modules relating to any suitable complex problem. Embodiments are not limited to operating with any particular problem or type of problem, or evaluating any particular data or type of data, or executing any particular instructions or type of instructions. As in examples described above, techniques described herein may be used in a financial setting to perform operations related to a financial arbitrage problem, for identifying desirable sequences of trades to carry out in a financial arbitrage setting.

Figure 13:
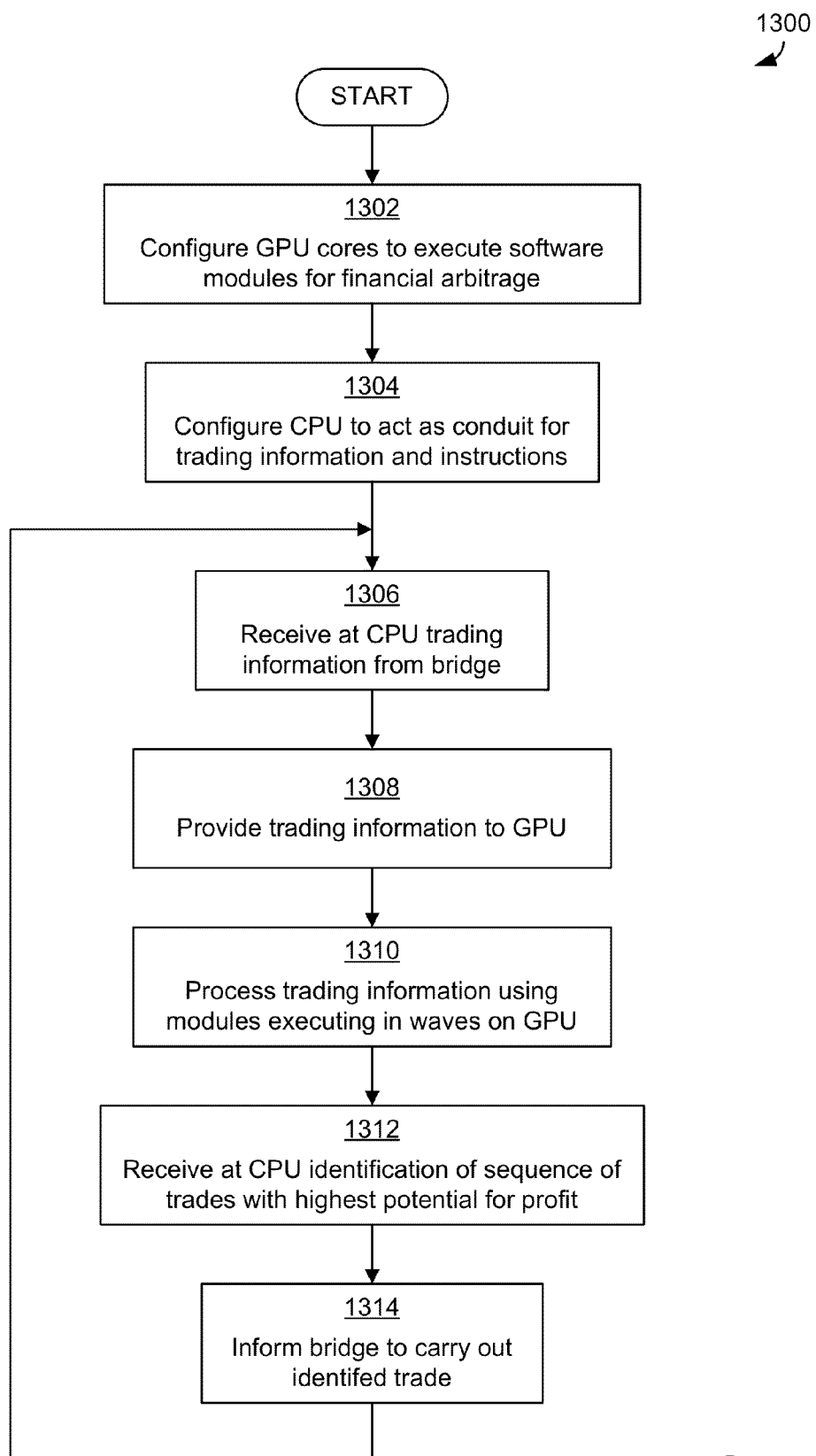
FIG. 13 is a flowchart of an exemplary process for operating one or more processing units to execute software modules to carry out a trading system.

FIG. 13 illustrates an example of an overall process for executing software modules related to financial arbitrage on multicore processing units. In the example of FIG. 13, the multicore processing units include one or more central processing units and one or more graphics processing units. The central processing units and graphics processing units may be components of a computing device that is located in a computer system similar to the one illustrated in FIG. 2. Accordingly, the computing device including the multicore processing units on which the software modules may execute may be communicatively coupled to a bridge that may be instructed to carry out financial trades.

Prior the start of the process 1300 of FIG. 13, the software developer creates software modules and the software modules are evaluated by software development tool. In accordance with techniques described herein, the software development tool may produce configuration information for multicore processing units based on the software modules created by the software developer. Configuration information, including scheduling constraint information, produced by the software development tool may be used to configure the multicore processing units of the computing device.

The process 1300 begins in block 1302, in which processing cores of the graphics processing unit are configured by a configuration facility to execute software modules for financial arbitrage. In block 1304, the central processing unit of the computing device is configured with instructions for acting as a conduit for transferring trading information and trading instructions between the graphics processing unit and the bridge of the computing system.

In block 1306, the central processing unit receives trading information transmitted to the computing device by the bridge and, in block 1308, the central processing unit provide the receipts trading information to the graphics processing unit. By providing the trading information to the graphics processing unit, the trading information is made available to software modules will execute on processing cores of the graphics processing unit. Accordingly, in block 1310, software modules are executed in successive waves on the processing cores of the graphics processing unit, to process the trading information received from the bridge. The software modules that are executed by the processing cores in block 1310 and may include any suitable software modules executing any suitable instructions. In some embodiments, for example, the software modules executed in block 1310 may include software modules of the types illustrated in FIG. 7C.

As a result of processing the trading information received from the bridge, these software modules, executed on the processing cores of the graphics processing unit may collectively select a sequence of potential trades to be executed that has the highest potential for profit out of the sequences of potential trades identified by the trading information received from the bridge. In block 1312, the identification of the selected sequence of potential trades having the highest potential for profit is received at the central processing unit from the graphics processing unit. In response, the central processing unit, in block 1314, creates an instruction identifying that the sequence of potential trades should be executed, and transmits the instructions to the bridge.

After the instruction has been transmitted to the bridge in block 1314, process 1300 returns the block 1306, in which the central processing unit receives new trading information and again, in block 1308, provides the trading information to the graphics processing unit for processing by the software modules. In some embodiments, the central processing unit and graphics processing unit of the computing device may continue processing trading information and issuing instructions for sequences of potential trades to be executed for as long as trading information is received at the bridge and communicated to the central processing unit.

In the examples of FIGS. 2 and 13, the bridge was illustrated and described as being implemented on a different computing device than the computing device including the multicore processing units executing the software modules. It should be appreciated, however, that embodiments are not limited to implementing a bridge and multicore processing unit(s) executing the software modules on different computing devices. For example, a computing device may implement bridge functionality and may additionally include one or more multicore processing units on which software modules may be executed to evaluate trading information received by the bridge and identify desirable sequences of potential trades to be executed. In some embodiments that process trading information, the bridge and the multicore processing units may be implemented together or separately using one or more rack-mounted servers that are co-located in a server room with devices distributes trading information on behalf of one or more counterparties to potential trades.

Techniques operating according to the principles described herein may be implemented in any suitable manner. Included in the discussion above are a series of flow charts showing the steps and acts of various processes that configure low-cost hardware to execute operations for complex problems quickly and efficiently. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit, a Field-Programmable Gate Array (FPGA), or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1406 of FIG. 14 described below (i.e., as a portion of a computing device 1400) or as a stand-alone, separate storage medium. As used herein, "computer-readable media" (also called "computer-readable storage media" or "storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 14:
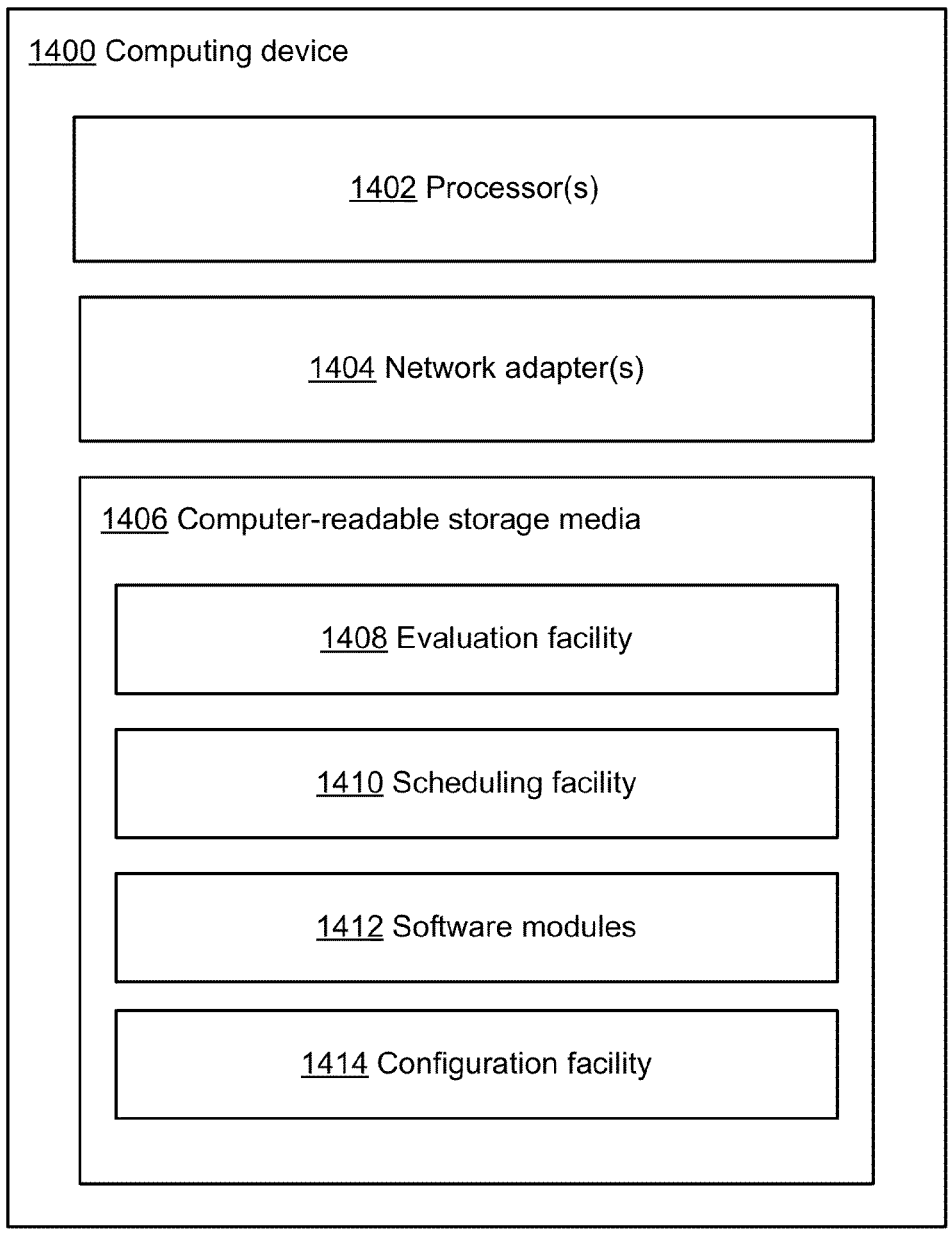
FIG. 14 is a block diagram of a computing device with which some embodiments may operate.

FIG. 14 illustrates one exemplary implementation of a computing device in the form of a computing device 1400 that may be used in a system implementing the techniques described herein, although others are possible. It should be appreciated that FIG. 14 is intended neither to be a depiction of necessary components for a computing device to operate in accordance with the principles described herein, nor a comprehensive depiction.

Computing device 1400 may comprise at least one processor 1402 that may include one or more multicore processors, a network adapter 1404, and computer-readable storage media 1406. Computing device 1400 may be, for example, a desktop or laptop personal computer, a server, a rack-mounted computer, or any other suitable computing device. The at least one processor 1402 may include one or more multicore processing units, which may include central processing units and/or graphics processing units. Network adapter 1404 may be any suitable hardware and/or software to enable the computing device 1400 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1406 may be adapted to store data to be processed and/or instructions to be executed by processor 1402. Processor 1402 enables processing of data and execution of instructions. The data and instructions may be stored on the computer-readable storage media 1406.

The data and instructions stored on computer-readable storage media 1406 may comprise computer-executable instructions implementing techniques which operate according to the principles described herein. In the example of FIG. 14, computer-readable storage media 1406 stores computer-executable instructions implementing various facilities and storing various information as described above. Computer-readable storage media 1406 may store an evaluation facility 1408 that may operate as a software development tool in accordance with techniques described herein. The evaluation facility 1408 may perform any suitable operations to evaluate software modules for execution one processing cores of one or more multicore processing units. The computer-readable storage media 1406 may also include a scheduling facility 1410 that operates according to scheduling constraint information to assign software modules to processing cores of one or more multicore processing units for execution. The computer-readable storage media 1406 may additionally store software modules 1412 for execution on processing cores, and may store a configuration facility 1414 to configure one or more multicore processing units for executing the software modules 1412 based on configuration information generated by the evaluation facility 1408.

While not illustrated in FIG. 14, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
generating, using at least one processor, a plurality of processing chains for parallel execution on at least one processing unit comprising a plurality of processing cores, the generating comprising generating each of the plurality of processing chains according to a template processing chain and a specification of data to be processed by the plurality of processing chains, the template processing chain comprising a plurality of software modules in which at least one software module receives one or more inputs that are one or more outputs of one or more other software modules of the plurality of software modules, the specification of data defining a plurality of inputs to be processed by the plurality of processing chains, wherein the generating comprises generating the plurality of processing chains such that each processing chain of the plurality of processing chains is adapted to cause the at least one processing unit to perform operations defined by the plurality of software modules on at least a portion of the data defined by the specification of data;
selecting a configuration for the at least one processing unit for executing the plurality of processing chains on the plurality of processing cores, the selecting being carried out based at least in part on an execution efficiency of the plurality of processing chains when the at least one processing unit is configured according to the configuration; and
producing configuration information for configuring the at least one processing unit according to the configuration, wherein:
selecting the configuration comprises selecting a configuration in which software modules of each of the plurality of processing chains are executed on the plurality of processing cores according to a schedule;
the plurality of processing cores comprises a plurality of types of processing core;
at least one first processing core of a first type of processing core comprises at least one first component permitting the at least one first processing core to execute a first set of one or more instructions in a manner different from a manner in which processing cores of other types execute the first set of one or more instructions;
at least one second processing core of a second type of processing core does not comprise the at least one first component; and
the method further comprises generating scheduling information for the configuration at least in part by assigning software modules of the plurality of processing chains to types of processing core, wherein the assigning comprises:
evaluating executable instructions of a first software module of the software modules,
identifying, based on the evaluating, that the first type of processing core is suitable for executing the executable instructions of the first software module, and
storing information indicating that the first software module is to be executed on a processing core of the first type.

2. The method of claim 1, wherein selecting the configuration based at least in part on execution efficiency comprises selecting the configuration based at least in part on amount of time the plurality of processing cores will spend executing operations for the plurality of processing chains and/or the amount of time the plurality of processing cores will spend not executing operations for the plurality of processing chains when the at least one processing unit is configured according to the configuration.

3. The method of claim 1, wherein evaluating executable instructions of the first software module comprises evaluating the executable instructions to determine one or more characteristics of the executable instructions selected from a group of characteristics consisting of: a number of storage access instructions included in the executable instructions, a type of storage accessed by the executable instructions, and a number of logic instructions included in the executable instructions.

4. The method of claim 1, wherein:
a number of software modules included in the plurality of processing chains is larger than a number of processing cores of the plurality of processing cores;
the scheduling information comprises information identifying a relative time at which each of the software modules included in the plurality of processing chains will execute on a processing core of the plurality of processing cores; and
the method further comprises generating the scheduling information for the configuration at least in part by assigning each software module of the plurality of processing chains to execute on a processing core of the plurality of processing cores at a relative time, wherein the assigning comprises:
identifying, in software modules of the plurality of software modules, a second software module that receives as an input data generated as an output of a first software module, and
storing information indicating that the plurality of processing cores should execute the first software module prior to executing the second software module.

5. The method of claim 1, wherein producing the configuration information comprises producing scheduling information in a format in which a scheduling tool for the at least one processing unit is adapted to receive scheduling information.

6. The method of claim 1, wherein:
the specification of data defines a plurality of types of data; and
generating the plurality of processing chains comprises generating a processing chain that corresponds to a plurality of permutations of the plurality of types of data, each permutation of the plurality of permutations comprising more than one of the plurality of types of data, the plurality of processing chains each being adapted to accept a plurality of inputs for the types of data of the corresponding permutation and to cause the at least one processing unit to perform operations defined by the plurality of software modules on the plurality of inputs.

7. The method of claim 6, wherein identifying the plurality of permutations comprises generating all permutations of the plurality of types of data.

8. The method of claim 6, further comprising:
receiving a user input triggering generation of the plurality of processing chains; and
generating the plurality of processing chains according to the template processing chain without receiving further user input during the generating.

9. The method of claim 1, wherein generating the plurality of processing chains for parallel execution on the at least one processing unit comprising the plurality of processing cores comprises generating at least some of the plurality of processing chains for execution on at least one generally-programmable graphics processing unit.

10. The method of claim 1, wherein generating the plurality of processing chains for parallel execution on the at least one processing unit comprising the plurality of processing cores comprises generating at least some of the plurality of processing chains for execution on at least one field-programmable gate array (FPGA).

11. A method comprising:
generating, using at least one processor, a plurality of processing chains for parallel execution on at least one processing unit comprising a plurality of processing cores, the generating comprising generating each of the plurality of processing chains according to a template processing chain and a specification of data to be processed by the plurality of processing chains, the template processing chain comprising a plurality of software modules in which at least one software module receives one or more inputs that are one or more outputs of one or more other software modules of the plurality of software modules, the specification of data defining a plurality of inputs to be processed by the plurality of processing chains, wherein the generating comprises generating the plurality of processing chains such that each processing chain of the plurality of processing chains is adapted t cause the a t least g unit to perform operations defined by the plurality of software modules on at least a portion of the data defined by the specification of data;
selecting a configuration for the at least one processing unit for executing the plurality of processing chains on the plurality of processing cores, the selecting being carried out based at least in part on an execution efficiency of the plurality of processing chains when the at least one processing unit is configured according to the configuration; and
producing configuration information for configuring the at least one processing unit according to the configuration, wherein selecting the configuration from the plurality of potential configurations comprises selecting a configuration in which only a portion of the software modules generated in the generating of the plurality of processing chains are executed on the plurality of processing cores to implement the plurality of processing chains, and
wherein the method further comprises identifying the portion of the software modules to be executed to implement the plurality of processing chains for the configuration, the identifying comprising:
evaluating software modules generated during the generating of the plurality of processing chains to identify a duplicate software module in the software modules that is a duplicate of another software module of the software modules, a duplicate software module performing a same operation on a same input to produce a same output as another software module, and
in response to determining, based on the evaluating, that a first software module of the software modules generated during the generating of the plurality of processing chains is a duplicate software module of a second software module, determining that the first software module is not to be included in the portion of the software modules to be executed to implement the plurality of processing chains.

12. The method of claim 11, further comprising, in response to determining that the first software module is a duplicate software module of the second software module:
identifying an output destination for an output of the first software module; and
editing, using the at least one processor, the plurality of software modules generated during the generating of the plurality of processing chains such that the second software module additionally provides at least one output to the output destination.

13. The method of claim 12, further comprising storing, in at least one computer-readable storage medium, the portion of the software modules to be executed to implement the plurality of processing chains and information identifying a source of an input and a destination of an output for at least some of the software modules of the portion, the information that identifies the destination of the output for the second software module specifying that the output destination for the output of the first software module includes a destination of at least one output of the second software module.

14. A method comprising:
generating, using at least one processor, a plurality of processing chains for parallel execution on at least one processing unit comprising a plurality of processing cores, the generating comprising generating each of the plurality of processing chains according to a template processing chain and a specification of data to be processed bye plurality of processing chains the template processing chain comprising a plurality of software modules in which at least one software module receives one or more inputs that are one or more outputs of one or more other software modules of the plurality of software modules, the specification of data defining a plurality of inputs to be processed by the plurality of processing chains, wherein the generating comprises generating the plurality of processing chains such that each processing chain of the plurality of processing chains is adapted to cause the at least one processing unit to perform operations defined by the plurality of software modules on at least a portion of the data defined by the specification of data
selecting a configuration for the at least one processing unit for executing the plurality of processing chains on the plurality of processing cores, the selecting being carried out based at least in part on an execution efficiency of the plurality of processing chains when the at least one processing unit is configured according to the configuration; and
producing configuration information for configuring the at least one processing unit according to the configuration, wherein selecting the configuration from the plurality of potential configurations comprises selecting a configuration in which more software modules than the software modules generated in the generating of the plurality of processing chains are executed on the plurality of processing cores to implement the plurality of processing chains, and
wherein the method further comprises generating additional software modules to be executed to implement the plurality of processing chains for the configuration, the identifying comprising:
evaluating the software modules generated during the generating of the plurality of processing chains to identify a first software module that provides an output to at least one second software module and to at least one third software module,
in response to determining, based on the evaluating, that the first software module of the software modules generated during the generating of the plurality of processing chains provides an output to the at least one second software module and the at least one third software module, copying the first software module to create an additional software module, and storing, in at least one computer-readable storage medium, software modules to be executed to implement the plurality of processing chains and information identifying a source of an input and a destination of an output for at least some of the software modules of the portion, the information identifying that the at least one second software module is a destination of an output of the first software module and that the at least one third software module is a destination of an output of the additional software module.

15. A method comprising:
evaluating, using at least one processor, a plurality of software modules for execution on at least one processing unit comprising a plurality of processing cores, a first portion of the plurality of software modules receiving as inputs outputs generated by a second portion of the plurality of software modules, the evaluating comprising evaluating the plurality of software modules to identify at least one change to the plurality of software modules to increase an execution efficiency of the plurality of software modules when executed in parallel on the at least one processing unit comprising the plurality of processing cores; and
in response to the evaluating, automatically editing, using the at least one processor, the plurality of software modules to implement the at least one change to increase the execution efficiency of the plurality of software modules
wherein:
the plurality of software modules comprises a first software module that provides an output to a second software module and a third software module that provides a same output as the first software module; and
automatically editing the plurality of software modules comprises removing the first software module from the plurality of software modules and configuring the third software module to provide the output to the second software module.

16. The method of claim 15, wherein:
evaluating the plurality of software modules comprises evaluating software modules of the plurality to identify any duplicate software modules in the software modules that are a duplicate of another software module of the software modules, a duplicate software module performing a same operation on a same input to produce a same output as another software module, and
removing the first software module is performed in response to determining, based on the evaluating, that the first software module of the software modules is a duplicate software module of the third software module.

17. The method of claim 15, wherein automatically editing the plurality of software modules via the at least one processor comprises editing the plurality of software modules without accepting user input regarding the at least one change.

18. The method of claim 15, wherein evaluating the plurality of software modules for execution on the at least one processing unit comprising the plurality of processing cores comprises evaluating at least some of the plurality of processing chains for execution on at least one generally-programmable graphics processing unit.

19. The method of claim 15, wherein evaluating the plurality of software modules for execution on the at least one processing unit comprising the plurality of processing cores comprises evaluating at least some of the plurality of processing chains for execution on at least one field-programmable gate array (FPGA).

20. A method comprising:
evaluating, using at least one processor, a plurality of software modules for execution on at least one processing unit comprising a plurality of processing cores, a first portion of the plurality of software modules receiving as inputs outputs generated by a second portion of the plurality of software modules, the evaluating comprising evaluating the plurality of software modules to identify at least one change to the plurality of software modules to increase an execution efficiency of the plurality of software modules when executed in parallel on the at least one processing unit comprising the plurality of processing cores; and
in response to the evaluating, automatically editing, using the at least one processor, the plurality of software modules to implement the at least one change to increase the execution efficiency of the plurality of software modules,
wherein:
the plurality of software modules comprises a first software module that provides an output to at least one second software module and at least one third software module; and
automatically editing the plurality of software modules comprises create a duplicate software module for the first software module, configuring the first software module to provide the output to the at least one second software module and not the at least one third software module, and configuring the duplicate software module to provide the output to the at least one third software module.

21. The method of claim 20, wherein:
evaluating the plurality of software modules comprises evaluating software modules of the plurality of software modules to identify a software module that provides an output to a plurality of software modules, and
creating the duplicate software module is performed in response to determining, based on the evaluating, that the first software module of the software modules generated during the generating of the plurality of processing chains provides an output to the at least one second software module and the at least one third software module.

22. A method comprising:
evaluating, using at least one processor, operations of a plurality of software modules to be executed in parallel on a plurality of processing cores;
evaluating, using at least one processor, characteristics of data to be processed by the plurality of software modules; and
based at least in part on the evaluation of the operations and the evaluation of the characteristics, producing configuration information for configuring the plurality of processing cores to execute the plurality of software modules, wherein producing the configuration information comprises producing configuration information based at least in part on differences between a first type of processing core of the plurality of processing cores and a second type of processing core of the plurality of processing cores,
wherein:
the plurality of processing cores comprises at least one first processing core of the first type, each of the at least one first processing core of the first type comprising at least one first component permitting the at least one first processing core to execute a first set of one or more instructions in a manner different from a manner in which processing cores of the second type execute the first set of one or more instructions;
the plurality of processing cores comprises at least one second processing core of the second type, each of the at least one second processing core not comprising the at least one first component;
the plurality of software modules comprise a first software module including instructions that, when executed by a processing core of the plurality of processing cores, cause the processing core to perform an operation;
evaluating the plurality of software modules comprises evaluating the instructions to cause a processing core the perform the operation; and
producing the configuration information comprises:
determining that instructions of the first set of instructions would cause a processing core to perform the operation; and
editing the first software module to replace at least a portion of the instructions to cause a processing core to perform the operation with instructions of the first set of instructions.

23. The method of claim 22, wherein the at least one first processing core is one or more processing cores of a graphics processing unit and the at least one second processing core is one or more processing cores of a central processing unit.

24. The method of claim 22, wherein the at least one first processing core is one or more processing cores of a graphics processing unit and the at least one second processing core is one or more other processing cores of the graphics processing unit.

25. The method of claim 22, wherein the at least one first processing core is one or more processing cores of a first multicore processing unit and the at least one second processing core is one or more processing cores of a second multicore processing unit different from the first multicore processing unit.

26. The method of claim 22, wherein:
each of the at least one second processing core of the second type comprises at least one second component permitting the at least one second processing core to execute a second set of one or more instructions in a manner different from a manner in which processing cores of the first type execute the second set of one or more instructions;
the at least one first processing core of the first type does not comprise the at least one second component.

27. The method of claim 22, wherein:
the at least one first component of the at least one first processing core of the first type is a plurality of first components; and
the plurality of first components collectively permit the at least one first processing core of the first type to execute the first set of instructions in the manner different from the manner in which processing cores of the second type execute the first set of instructions.

28. The method of claim 22, wherein:
the plurality of software modules comprise a first software module including a first instruction of the first set of instructions;
evaluating the plurality of software modules comprises evaluating the first instruction; and
producing configuration information based at least in part on differences between the first type of processing core and the second type of processing core comprises producing scheduling information indicating that the first software module should be executed on one of the at least one first processing core of the of the first type.

29. The method of claim 28, wherein producing the configuration information comprises:
- determining, during the evaluation of the operations of the plurality of processing cores, that the first software module comprises the first instruction of the first set of instructions; and
- in response to determining that the first software module comprises the first instruction, producing the scheduling information indicating that the first software module should be executed on one of the at least one first processing core of the first type.

30. The method of claim 22, wherein:
- a software module of the plurality of software modules comprises original instructions that not executable by processing cores of the plurality of processing cores;
- an interpreter associated with the plurality of processing cores interprets the original instructions of the first software module and produces interpreted instructions, corresponding to the original instructions of the first software module, that are executable on the plurality of processing cores; and
- producing the configuration information comprises producing information that configures the interpreter to produce, as interpreted instructions corresponding to one or more original instructions of the first software module, instructions of the first set of instructions.

* * * * *